United States Patent
Mayer et al.

(10) Patent No.: US 10,116,003 B2
(45) Date of Patent: Oct. 30, 2018

(54) METAL SULFIDE ANOLYTES FOR ELECTROCHEMICAL CELLS

(71) Applicant: QUANTUMSCAPE CORPORATION, San Jose, CA (US)

(72) Inventors: Marie Mayer, Santa Clara, CA (US); Joseph Han, Redwood City, CA (US)

(73) Assignee: QuantumScape Corporation, San Jose, CA (US)

(*) Notice: Subject to any disclaimer, the term of this patent is extended or adjusted under 35 U.S.C. 154(b) by 0 days.

(21) Appl. No.: 15/526,702

(22) PCT Filed: Feb. 1, 2016

(86) PCT No.: PCT/US2016/015982
§ 371 (c)(1),
(2) Date: May 12, 2017

(87) PCT Pub. No.: WO2016/126610
PCT Pub. Date: Aug. 11, 2016

(65) Prior Publication Data
US 2017/0324113 A1    Nov. 9, 2017

Related U.S. Application Data

(60) Provisional application No. 62/111,602, filed on Feb. 3, 2015.

(51) Int. Cl.
*H01M 4/00*    (2006.01)
*H01M 10/0562*    (2010.01)
(Continued)

(52) U.S. Cl.
CPC ..... *H01M 10/0562* (2013.01); *H01M 2/1673* (2013.01); *H01M 4/1395* (2013.01);
(Continued)

(58) Field of Classification Search
CPC ........... H01M 10/0562; H01M 10/058; H01M 2/1673; H01M 4/366; H01M 4/1395; H01M 4/5815
See application file for complete search history.

(56) References Cited

U.S. PATENT DOCUMENTS 4,288,505 A    9/1981    Joshi et al.
8,697,292 B2    4/2014    Kanno et al.
(Continued)

FOREIGN PATENT DOCUMENTS

JP    2007273217    10/2007
WO    WO2011118801 A1    9/2011

OTHER PUBLICATIONS

Ahn et al., "Synthesis and Lithium Conductivities of $Li_2SiS_3$ and $Li_4SiS_4$," Mat. Res. Bull., 1989, vol. 24, pp. 889-897.
(Continued)

*Primary Examiner* — Cynthia H Kelly
*Assistant Examiner* — Monique M Wills
(74) *Attorney, Agent, or Firm* — Squire Patton Boggs (US) LLP

(57) ABSTRACT

Provided are negative electrode assemblies containing lithium sulfide anolyte layers, electrochemical cells including these assemblies, and methods of forming thereof. An anolyte layer may be disposed over a metal layer of a current collector and may be used to separate the current collector from the rest of the electrolyte. The metal layer may include copper or any other suitable metal that forms in situ a metal sulfide during fabrication of the electrode assembly. Specifically, a sulfur containing layer, such as a solid electrolyte, is formed on the metal layer. Sulfur from this layer reacts with the metal of the current collector and forms a metal sulfide layer. When lithium is later added to the metal sulfide layer, a lithium sulfide anolyte layer is formed while the
(Continued)

metal layer is recovered. Most, if not all operations may, be performed in situ during fabrication of electrochemical cells.

30 Claims, 11 Drawing Sheets

(51) Int. Cl.

| | | |
|---|---|---|
| H01M 2/16 | (2006.01) | |
| H01M 4/1395 | (2010.01) | |
| H01M 4/36 | (2006.01) | |
| H01M 4/58 | (2010.01) | |
| H01M 4/66 | (2006.01) | |
| H01M 10/058 | (2010.01) | |
| H01M 4/04 | (2006.01) | |
| H01M 4/1397 | (2010.01) | |
| H01M 4/40 | (2006.01) | |
| H01M 10/0525 | (2010.01) | |

(52) U.S. Cl.
CPC ......... *H01M 4/366* (2013.01); *H01M 4/5815* (2013.01); *H01M 4/661* (2013.01); *H01M 4/667* (2013.01); *H01M 10/058* (2013.01); *H01M 4/0447* (2013.01); *H01M 4/1397* (2013.01); *H01M 4/405* (2013.01); *H01M 10/0525* (2013.01)

(56) References Cited

U.S. PATENT DOCUMENTS

| | | |
|---|---|---|
| 2003/0031931 A1 | 2/2003 | Obrovac et al. |
| 2006/0147806 A1 | 7/2006 | Kugai et al. |
| 2006/0246355 A1 | 11/2006 | Min et al. |
| 2007/0160911 A1 | 7/2007 | Senga et al. |
| 2009/0226816 A1 | 9/2009 | Yoshida et al. |
| 2010/0279176 A1 | 11/2010 | Ogawa et al. |
| 2011/0229765 A1 | 9/2011 | Barker et al. |
| 2011/0259505 A1 | 10/2011 | Lee et al. |
| 2011/0262816 A1 | 10/2011 | Amatucci |
| 2011/0311875 A1 | 12/2011 | Lee et al. |
| 2012/0094185 A1 | 4/2012 | Tsuchda et al. |
| 2012/0196186 A1 | 8/2012 | Richard |
| 2013/0040200 A1* | 2/2013 | Uetani ............... H01M 4/134 429/220 |
| 2013/0040208 A1 | 2/2013 | Kanno et al. |
| 2014/0054492 A1* | 2/2014 | Mukai ............... H01M 4/136 252/182.1 |
| 2014/0162138 A1* | 6/2014 | Fujiki ............... H01M 10/0562 429/322 |
| 2014/0363745 A1 | 12/2014 | Hirayama |
| 2015/0017548 A1 | 1/2015 | Kato et al. |
| 2015/0037687 A1 | 2/2015 | Kanno |
| 2016/0380315 A1* | 12/2016 | Weicker ............. H01M 10/441 320/136 |

OTHER PUBLICATIONS

Andrews et al., "Infrared Spectra of $P_4S_{10}$ and its Decomposition Products in Solid Argon," Inorganic Chemistry, 1990, vol. 29, pp. 5222-5225.

Aotani et al., "Synthesis and electrochemical properties of lithium ion conductive glass, $Li_3PO_4$—$Li_2S$—$SiS_2$," Solid State Ionics, 1994, vol. 68, pp. 35-39.

Bartholomew et al., "Electrical properties of new glasses based on the $Li_2S$—$SiS_2$ system," Journal of Non-Crystalline Solids, 1999, vol. 256 & 257, pp. 242-247.

Creus et al., "The Use of Ionic and Mixed Conductive Glasses in Microbatteries," Materials Science and Engineering, 1989, B3, pp. 109-112.

Creus et al., "Thin films of ionic and mixed conductive glasses: their use in microdevices," Solid State Ionics, 1992, vol. 53-56, pp. 641-646.

Deiseroth et al., "$Li_6PS_5X$: A Class of Crystalline Li Rich Solids with an Unusually High Li+ Mobility," Angew. Chem. Int. Ed., 2008, vol. 47, pp. 755-758.

Duluard et al., "Lithium conducting solid electrolyte $Li_{13}A_{53}Tiu(PO_4)_3$ obtained via solution chemistry," Journal of the European Ceramic Society, 2012, 9 pages.

Eckert et al., "Structural Transformation of Non-Oxide Chalcogenide Glasses. The Short-Range Order of $Li_2S$—$P_2S_5$ Glasses Studied by Quantitative $^{31}P$ and $^{6,7}Li$ High-Resolution Solid-State NMR," Chem. Mater., 1990, vol. 2, pp. 273-279.

Hayashi et al., "Characterization of $Li_2S$—$P_2S_5$ glass-ceramics as a sold electrolyte for lithium secondary batteries," Solid State Ionics, 2004, vol. 175, pp. 683-686.

Hayashi et al., "Characterization of $Li_2S$—$SiS_2$—$Li_3MO_3$ (M=B, Al, Ga and In) oxysulfide glasses and their application to solid state lithium secondary batteries," Solid State Ionics, 2002, vol. 152-153, pp. 285-290.

Hayashi et al., "Development of sulfide glass-ceramic electrolytes for all-solid-state lithium rechargeable batteries," J. Solid State Electrochem, 2010, vol. 14, pp. 1761-1767.

Hayashi et al., "Formation of $Li^+$ superionic crystals from the $Li_2S$—$P_2S_5$ melt-quenched glasses," J. Mater Sci, 2008, vol. 43, pp. 1885-1889.

Hayashi et al., "Formation of superionic crystals from mechanically milled $Li_2S$—$P_2S_5$ glasses," Electrochemistry Communications, 2003, vol. 5, pp. 111-114.

Hayashi et al., "Improvement of chemical stability of $Li_3PS_4$ glass electrolytes by adding MxOy (M=Fe, Zn, and Bi) nanoparticles," Journal of Materials Chemistry A, 2013, vol. 1, pp. 6320-6326.

Hayashi et al., "Preparation of $Li_2S$—$P_2S_5$ Amorphous Solid Electrolytes by Mechanical Milling," Journal of the American Ceramic Society, 2001, vol. 84, pp. 477-479.

Hirai et al., "Thermal and electrical properties of rapidly quenched glasses in the systems $Li_2S$—$SiS_2$—$Li_xMO_y$ ($Li_x$=$Li_4SiO_4$, $Li_2SO_4$)," Solid State Ionics, 1995, vol. 78, pp. 269-273.

Hu et al., "Ionic Conductivity of Lithium Orthosilicate-Lithium Phosphate Solid Solutions," J. Electrochem. Soc., 1977, vol. 124, No. 8, pp. 1240-1242.

Kaib et al., "New Lithium Chalcogenidotetrelates, LiChT: Synthesis and Characterization of the $Li^+$-Conducting Tetralithium ortho-Sulfidostannate $Li_4SnS_4$," Chemistry of Materials, 2012, vol. 24, pp. 2211-2219.

Kamaya et al., "A lithium superionic conductor," Nature Materials, 2011, vol. 10, pp. 682-686.

Kanno, "Lithium Ionic Conductor Thio-LISICON, the $Li_2S$—$GeS_2$—$P_2S_5$ System," Journal of the Electrochemical Society, 2001, vol. 148, pp. A742-A746.

Kanno, "Synthesis of a new lithium ionic conductor, thio-LISICON-lithium germanium sulfide system," Solid State Ionics, 2000, vol. 130, pp. 97-104.

Kennedy et al., "A Highly Conductive Li-Glass System: (1-x)(0.4$SiS_2$—0.6$Li_2S$)-xLiI," J. Electrochem. Soc., 1986, pp. 2437-2438.

Kobayashi et al., "Interfacial reactions at electrode/electrolyte boundary in all solid-state lithium battery using inorganic solid electrolyte, thio-LISICON," Electrochimica Acta, 2008, vol. 53, pp. 5045-5050.

Kondo et al., "New lithium ion conductors based on $Li_2S$-$SiS_2$ system," Solid State Ionics, 1992, vol. 53-56, pp. 1183-1186.

Leal-Gonzalez et al., "Structure of Lithium Sulfide, $LiGaS_2$," Acta. Cryst., 1990, pp. 2017-2019.

Liu et al., "Anomalous High Iconic Conductivity of Nanoporous R—$Li_3PS_4$," Journal of the American Chemical Society, 2012, 4 pages.

Liu et al., "High performance $Li_2S$-$P_2S_5$ solid electrolyte induced by selenide," Journal of Power Sources, 2014, vol. 260, pp. 264-267.

Menetrier et al., "Iconic conduction in $B_2S_3$—$Li_2S$—LiI glasses," Solid State Ionics, 1992, vol. 53-56, pp. 1208-1213.

Mercier et al., "Superionic Conduction in $Li_2S$—$P_2S_5$—LiI-Glasses," Solid State Ionics, 1981, vol. 5, pp. 663-666.

Minami et al., "Electrical and electrochemical properties of the 70$Li_2S$ (30−x)$P_2S_5$x$P_2O_5$ glass-ceramic electrolytes," Solid State Ionics, 2008, vol. 179, pp. 1282-1285.

(56) References Cited

OTHER PUBLICATIONS

Minami et al., "Electrical and electrochemical properties of glass-ceramic electrolytes in the systems $Li_2S$—$P_2S_5$—$P_2S_3$ and $Li_2S$—$P_2S_5$-$P_2O_5$," Solid State Ionics, 2011, vol. 192, pp. 122-125.
Minami et al., "Lithium ion conductivity of the $Li_2S$—$P_2S_5$ glass-based electrolytes prepared by the melt quenching method," Solid State Ionics, 2007, vol. 178, pp. 837-841.
Minami et al., "Preparation and characterization of lithium ion-conducting oxysulfide glasses," Solid State Ionics, 2000, vol. 136-137, pp. 1015-1023.
Minami et al., "Recent progress of glass and glass-ceramics as solid electrolytes for lithium secondary batteries," Solid State Ionics, 2006, vol. 177, pp. 2715-2720.
Minami, "Fast Ion Conducting Glasses," Journal of Non-Crystalline Solids, 1985, vol. 73, pp. 273-284.
Mizuno et al., "All Solid-State Lithium Secondary Batteries Using High Lithium Ion Conducting $Li_2S$—$P_2S_5$ Glass-Ceramics," Chemistry Letters, 2002, pp. 1244-1245.
Mizuno et al., "High lithium ion conducting glass-ceramics in the system $Li_2S$—$P_2S_5$," Solid State Ionics, 2006, vol. 177, pp. 2721-2725.
Mizuno et al., "New, Highly Ion-Conductive Crystals Precipitated from $Li_2S$—$P_2S_5$ Glasses," Advanced Materials, 2005, vol. 17, No. 7, pp. 918-921.
Morimoto et al., "Mechanochennical Synthesis of New Amorphous Materials of $60Li_2S\cdot40SiS_2$ with High Lithium Ion Conductivity," J. Am. Ceram. Soc., 1999, vol. 82, pp. 1352-1354.
Muramatsu et al., "Structural change of $Li_2S$—$P2S_5$ sulfide solid electrolytes in the atmosphere," Solid State Ionics, 2011, vol. 182, pp. 116-119.
Murayama et al., "Material Design of New Lithium Ionic Conductor thio-LISICON, in the $Li_2S$—$P_2S_5$ System," Solid State Ionics, 2004, vol. 170, pp. 173-180.
Murayama et al., "Synthesis of New Lithium Ionic Conductor Thio-LISICON-Lithium Silicon Sulfides System," Journal of Solid State Chemistry, 2002, vol. 168, pp. 140-148.
Norrel et al., "Anion exchange of Oxygen by Sulfur in $GeO_2$-based glasses," Proceedings of SPIE, 2003, vol. 4990, pp. 87-96.
Ohtomo et al., "Characteristics of the $Li_2O$—$Li_2S$—$P_2S_5$ glasses synthesized by the two-step mechanical milling," Journal of Non-Crystalline Solids, 2013, vol. 364, pp. 57-61.
Ohtomo et al., "Electrical and electrochemical properties of $Li_2S$—$P_2S_5$—$P_2O_5$ glass-ceramic electrolytes," Journal of Power Sources, 2005, vol. 146, pp. 715-718.
Ohtomo et al., "Suppression of $H_2S$ gas from $Li_2S$—$P_2S_5$ glass electrolytes by the addition of $Li_2O$," The Electrochemical Society, 2012, 1 page.
Ooura et al., "A new lithium-ion conducting glass ceramic in the composition of $75Li_2S\cdot5P_2S_3\cdot20P_2S_5$ (mol %)," Solid State Ionics, 2013, 5 pages.
Pradel et al., "Lithium Chalcogenide Conductive Glasses," Materials Chemistry and Physics, 1989, vol. 23, pp. 121-142.
Pradel et al., "Ionically Conductive Chalcogenide Glasses," Journal of Solid State Chemistry, 1992, vol. 96, pp. 247-257.
Rao et al., "Synthesis and $Li^+$ ion Migration Studies of $Li_6PS_5X$ (X=Cl, Br, I)," Mater. Res. Soc. Symp. Proc., 2011, vol. 1331, 6 pages.
Sahu et al., "Air-Stable, High-Conduction Solid Electrolytes of Arsenic-Substituted $Li_4SnS_4$," Energy Environ. Sci., 2013, 9 pages.
Sakuda et al., "All-solid-state lithium secondary batteries using $LiCoO_2$ particles with pulsed laser deposition coatings of $Li_2S$—$P_2S_5$ solid electrolytes," Journal of Power Sources, 2011, vol. 196, pri. 6735-6741.
Sakuda et al., "Sulfide Solid Electrolyte with Favorable Mechanical Property for All-Solid-State Lithium Battery," Scientific Reports, 2013, 5 pages.
Seino et al., "A sulphide lithium super ion conductor is superior to liquid ion conductors for use in rechargeable batteries," Energy & Environmental Science, 2013, 5 pages.
Seino et al., "Synthesis and electrochemical properties of $Li_2S$—$B_2S_3$—$Li_4SiO_4$," Solid State Ionics, 2006, vol. 177, pp. 2601-2603.
Seino et al., "Synthesis of phosphorous sulfide solid electrolyte and all-solid-state lithium batteries with graphite electrode," Solid State Ionics, 2005, pp. 2389-2393.
Seino et al., Electronic Supplementary Material (ESI) to "A sulphide lithium super ion conductor is superior to liquid ion conductors for use in rechargeable batteries," Energy & Environmental Science, 2014, 4 pages.
Seo et al., "Fast lithium ion conducting solid state thin-film electrolytes based on lithium thio-germanate materials," Acta Materialia, 2011, vol. 59, pp. 1839-1846.
Seo et al., "Structural Properties of Lithium Thio-Germanate Thin Film Electrolytes Grown by Radio Frequency Sputtering," Inorganic Chemistry, 2011, vol. 50, pp. 2143-2150.
Sistla et at., "Structural studies on $xLi_2S$—$(1-x)P_2S_5$ glasses by X-ray diffraction and molecular dynamics simulation," Journal of Non-Crystalline Solids, 2004, vol. 349, pp. 54-59.
Sveinbjornsson et al., "Ionic Conductivity and the Formation of Cubic $CaH_2$ in the $LiBH_4$—$Ca(BH_4)_2$ Composit," Journal of Solid State Chemistry, 2013, 26 pages.
Tachez et al., "Ionic Conductivity of and Phase Transition in Lithium Thiophosphate $Li_3PS_4$," Solid State Ionics, 1984, vol. 14, pp. 181-185.
Takada et al., "Electrochemical behaviors of $Li^+$ ion conductor $Li_3PO_4$—$Li_2S$—$SiS_2$," Journal of Power Sources, 1993, vol. 43-44, pp. 135-141.
Takada et al, "Lithium ion conductive oxysulfide $Li_3PO_4$—$Li_3PS_4$," Solid State Ionics, 2005, vol. 176, pp. 2355-2359.
Takada et al., "Solid State Lithium Battery with Oxysulfide glass," Solid State Ionics, 1996, vol. 86-88, pp. 877-882.
Takahara et al., "Application of Lithium Metal Electrodes to All-Solid-State Lithium Secondary Batteries Using $Li_3PO_4$—$Li_2S$—$SiS_2$ Glass," Journal of the Electrochemical Society, 2004, vol. 151, Issue 9, pp. A1309-A1313.
Tatsumisago et al., "All-solid-state lithium secondary batteries using sulfide-based glass-ceramic electrolytes," Journal of Power Sources, 2006, vol. 159, pp. 193-199.
Teragawa et al., "Preparation of $Li_2S$—$P_2S_5$ solid electrolyte from N-methylformamide solution and application for all-solid-state lithium battery," Journal of Power Sources, 2014, vol. 248, pp. 939-942.
Trevey et al., "Glass-ceramic $Li_2S$—$P_2S_5$ electrolytes prepared by a single step ball billing process and their application for all-solid-state lithium-ion batteries," Electrochemistry Communications, 2009, vol. 11, pp. 1830-1833.
Ujiie et al., "Preparation and electrochemical characterization of $(100-x)(0.7Li_2S\ 0.3P_2S_5)$ $xLiBr$ glass-ceramic electrolytes," Mater Renew Systain Energy, 2013, 8 pages.
Yamashita et al., "Formation and ionic conductivity of $Li_2S$—$GeS_2$—$Ga_2S_3$ glasses and thin films," Solid State Ionics, 2003, vol. 158, pp. 151-156.
Yamauchi et al., "Preparation and ionic conductivities of $(100-x)(0.75Li_2S\ 0.25P_2S_5)$ $xLiBH_4$ glass electrolytes," Journal of Power Sources, 2013, 22 pages.

\* cited by examiner

*Electrolyte Deposition*

*Metal Sulfide Formation*

*Lithiation*

*Lithiation*

*Operational Cycling*

METAL SULFIDE ANOLYTES FOR ELECTROCHEMICAL CELLS

This application is a National Stage Filing under 35 USC 371 of International Application No. PCT/US2016/015982, filed on Feb. 1, 2016, and which claims priority to, and the benefit of, U.S. Provisional Patent Application No. 62/111,602, filed Feb. 3, 2015, the entire contents of each of which are herein incorporated by reference in their entirety.

BACKGROUND

The present disclosure relates to electrochemical cells (e.g., lithium secondary batteries) and, more specifically, to metal sulfide anolytes, such as lithium sulfide anolytes, for electrochemical cells.

Widespread use of mobile electronic devices and recent advances in hybrid and electrical vehicles has renewed focus and investments into battery technologies, such as lithium ion rechargeable batteries. In these batteries, an ion-conductive electrolyte electrically insulates the positive and negative electrodes but permits lithium ions to conduct therethrough, thereby causing charge-balancing electrons to conduct between these electrodes by way of an external circuit where useful electrical work can occur. Most lithium batteries use liquid electrolytes because of their high ionic mobility. However, liquid electrolytes can be unsafe, especially when combined with lithium metal negative electrodes, and some are chemically incompatible with certain battery components, such as copper conductors. Certain sulfide-based solid electrolytes have been known to react with copper current collectors with negative side effects. Additionally, during the operation of lithium ion rechargeable batteries, these batteries can be limited by the formation of lithium dendrites which grow through the electrolyte and electrically short the positive and negative electrodes. As such, much work is still needed in the field to which the instant disclosure pertains related to improvements in electrolytes, including, but not limited to, safety considerations, conductivity, and the prevention of lithium dendrites.

SUMMARY

Provided are negative electrode assemblies containing lithium sulfide anolyte layers, electrochemical cells including these assemblies, and methods of forming thereof. An anolyte layer may be disposed over a metal layer of a current collector and may be used to separate the current collector from the rest of the electrolyte. In some examples, the anolyte provides a protective layer over a lithium metal anode and an ion conducting pathway between the lithium metal anode and an electrolyte in contact with the anolyte. The metal layer may include copper or any other suitable metal that temporarily forms a metal sulfide during fabrication of the electrode assembly. Specifically, a sulfur containing layer, such as a solid electrolyte, is formed on the metal layer. In some examples, a negative electrode including a metal current collector layer is pressed or contacted with a cathode electrode which includes cathode active materials and a sulfur-based electrolyte layer overlaying the cathode active materials. Sulfur from the sulfur based electrolyte or from the sulfur-containing layer which contacts the metal layer reacts with the metal layer of the current collector and forms a metal sulfide layer. When lithium is later added to, or conducted through, the metal sulfide layer, a lithium sulfide anolyte layer is formed while the metal layer is recovered or reduced. Most, if not all operations may, be performed in situ during fabrication of electrochemical cells.

In some embodiments, the negative electrode assembly for a rechargeable electrochemical cell includes a current collector metal layer and an anolyte layer. The current collector metal layer may include one or more of the following metals: copper, nickel, iron, lithium, aluminum, magnesium, indium, tungsten, molybdenum, alloys thereof, multilayers thereof, and combinations thereof. The anolyte layer may be disposed over the current collector metal layer. In some embodiments, the anolyte layer is in direct physical contact with the current collector metal layer at least prior to initial charging of the rechargeable electrochemical cell. In some embodiments, after the electrochemical cell is charged, a lithium metal layer is positioned between the anolyte layer and the current collector metal layer. In certain embodiments, the anolyte layer is a part of a sulfide-containing solid electrolyte layer. In some examples, the anolyte layer includes a lithium sulfide compound.

In some embodiments, a combined average concentration of lithium and sulfur in the anolyte layer is greater than a combined average concentration of lithium and sulfur in the sulfide-containing solid electrolyte layer. In other words, the sulfide-containing solid electrolyte layer may include other components that are not present or present at lower concentrations in the anolyte layer. In certain specific embodiments, the sulfide-containing solid electrolyte layer includes other components (e.g., B, I, P, As, Sn, Si, Ge, or combinations thereof) that are not present in the anolyte layer. Specifically, the average concentration of lithium in the anolyte layer may be greater than the average concentration of lithium in the sulfide-containing solid electrolyte layer. In some embodiments, the average molar concentration of lithium in the anolyte layer may be greater than the average molar concentration of lithium in the sulfide-containing solid electrolyte layer. In some embodiments, the combined average concentration of lithium and sulfur in the anolyte layer is at least 90 atomic % or even at least about 95 atomic % or at least about 98 atomic %. The anolyte layer may include the metal of the current collector metal layer. For example, this metal may be copper, iron, and/or nickel. The concentration of this metal in the anolyte layer may be substantially less than the concentration of lithium.

In some embodiments, the thickness of the anolyte layer is between about 5 nanometers and 200 nanometers or, more specifically, between about 10 nanometers and 50 nanometers or even between about 10 nanometers and 20 nanometers. In some examples, the thickness of the anolyte layer is about 1 nm to about 100 nm. The lithium sulfide of the anolyte layer may be represented by $LiS_x$, such that $0<x\leq 2$. More specifically, the lithium sulfide of the anolyte layer may be represented by $Li_2S$ or by $Li_{1.944}S$.

In some embodiments, the sulfide-containing solid electrolyte layer also includes at least one of the following elements: lithium, phosphorous, silicon, germanium, antimony, arsenic, and tin. The average concentration of the at least one of these elements in the sulfide-containing solid electrolyte layer is greater than the average concentration of the at least one of these elements in the anolyte layer. For example, in some embodiments, the sulfide-containing solid electrolyte layer includes phosphorous in addition to lithium and sulfur. In some or other examples, the sulfide-containing solid electrolyte layer includes silicon in addition to lithium and sulfur. Furthermore, the sulfide-containing solid electrolyte layer may include germanium in addition to lithium and sulfur. In some embodiments, the sulfide-containing solid electrolyte layer includes arsenic in addition to lithium and sulfur. Furthermore, the sulfide-containing solid electrolyte layer may include tin in addition to lithium and sulfur. In some embodiments, the sulfide-containing solid electrolyte is selected from an electrolyte in International PCT Patent Application No. PCT/US14/38283, entitled SOLID STATE CATHOLYTE OR ELECTROLYTE FOR BATTERY USING $Li_4MP_BS_C$ (M=Si, Ge, AND/OR Sn), filed May 15, 2014, the contents of which are incorporated by reference in their entirety.

In some embodiments, the sulfide-containing solid electrolyte is used in combination with a ceramic electrolyte. Ceramic electrolytes suitable for use include those electrolytes set forth in International PCT Patent Application No. PCT/US2014/059575, entitled GARNET MATERIALS FOR LI SECONDARY BATTERIES AND METHODS OF MAKING AND USING GARNET MATERIALS, filed Oct. 7, 2014, the contents of which are incorporated by reference in their entirety The sulfide of the sulfide-containing solid electrolyte layer is one or more of evaporated lithium phosphorous sulfide or, generally, lithium phosphorous sulfide (LPS), evaporated lithium silicon sulfide or, generally, lithium silicon sulfide (LSS), evaporated lithium silicon tin phosphorous sulfide or, generally, lithium silicon tin phosphorous sulfide (LSTPS), evaporated lithium tin sulfide or, generally, lithium tin sulfide (LTS), evaporated lithium arsenic tin sulfide or, generally, lithium arsenic tin sulfide (LATS), evaporated lithium germanium phosphorous sulfide or, generally, lithium germanium phosphorous sulfide (LGPS), evaporated lithium phosphorous sulfide doped with oxygen or, generally, lithium phosphorous sulfide doped with oxygen (LPSO), evaporated lithium silicon tin phosphorous sulfide doped with oxygen or, generally, lithium silicon tin phosphorous sulfide doped with oxygen (LSTPSO), and a polymer-sulfide composite. More specifically, the sulfide-containing solid electrolyte layer may include evaporated lithium phosphorous sulfide and/or lithium phosphorous sulfide (LPS). In the same or other examples, the sulfide-containing solid electrolyte layer may include evaporated lithium phosphorous sulfide doped with oxygen and/or lithium phosphorous sulfide doped with oxygen (LPSO). In some examples, the sulfide-containing solid electrolyte is (20-60)$Li_2S$-(20-60)$B_2S_3$-(0-50)LiX, wherein X is a halogen selected from F, Cl, I, B, or combinations thereof. In some examples, the sulfide-containing solid electrolyte is (20-60)$Li_2S$-(20-60)$B_2S_3$-(0-50)LiI.

In some embodiments, the current collector metal layer is a part of a bilayer current collector. The bilayer current collector may include a base layer having a metal different from the metal of the current collector metal layer. While the metal of the current collector metal layer may form a metal sulfide while forming the anolyte layer, the metal of the base layer may not form any such sulfides. In some examples, a limiting amount of the metal layer is used so that, when in contact with a sulfide-containing layer, only about 1 nm to 100 nm of metal sulfide is formed overlaying the base layer. For example, the metal of the current collector metal layer may include copper. The metal of the base layer may include nickel, iron, lithium, aluminum, magnesium, indium, alloys thereof, multilayers thereof, and combinations thereof. In certain examples, the metal of the base layer may include nickel. In some examples, when copper is a part of the current collector metal layer, the copper may be substantially free from oxygen. In some embodiments, the metal of the base layer is a different type of Cu than the Cu in the current collector metal layer. For example, the base layer may include off-the-roll copper and the current collector metal layer may include sputtered Cu, evaporated copper, or electroplated copper. In some examples, the base layer may include off-the-roll copper and the current collector metal layer may include sputtered Cu, evaporated copper, or electroplated copper, which is substantially free from oxygen. In some of these examples, the off-the-roll base layer (e.g., Cu) does not form a metal sulfide but the metal, which is substantially free from oxygen and overlaying the base layer, does form a metal sulfide when in contact with a sulfide-containing layer. As set forth herein, this metal sulfide can subsequently be converted into a lithium sulfide anolyte layer overlaying the base layer by introducing lithium to the metal sulfide which forms when the current collector metal layer reacts with a sulfide-containing layer.

In some embodiments, the current collector base layer is Al. In other examples, the current collector base layer is stainless steel. In still other examples, the current collector base layer is Fe.

In some embodiments, the negative electrode also includes a lithium metal layer disposed between the current collector metal layer and the anolyte layer. The lithium metal layer may be formed during operation of the rechargeable electrochemical cell containing the negative electrode. Specifically, when the cell is charged, lithium is transferred to the negative electrode and the lithium metal layer may form or increase in size or amount between the current collector metal layer and the anolyte layer. In some embodiments, some lithium may be retained between the current collector metal layer and the anolyte layer even when the cell is discharged.

Also provided is a battery having a positive electrode, a negative electrode, and a sulfide-containing solid electrolyte layer. Various examples of suitable negative electrodes are described above and elsewhere in this disclosure. In some embodiments, the negative electrode may include a current collector metal layer containing at least one of the following metals: copper, nickel, iron, lithium, aluminum, tungsten, molybdenum, magnesium, indium, alloys thereof, multilayers thereof, and combinations thereof. The sulfide-containing solid electrolyte layer is disposed between the positive electrode and the negative electrode and provides ionic communication (i.e., conductivity for Li ions) between the positive electrode and the negative electrode. The sulfide-containing solid electrolyte comprises an anolyte layer disposed over the current collector metal layer. The anolyte layer includes a lithium sulfide compound.

Also provide is a method of forming an anolyte layer on a negative electrode of a rechargeable electrochemical cell. In some examples, the method includes providing a substrate having a current collector metal layer. The current collector metal layer may include at least one of the following metals: copper, nickel, iron, lithium, aluminum, magnesium, indium, alloys thereof, multilayers thereof, and combinations thereof. The method may proceed with depositing a sulfur-containing layer onto the current collector metal layer. In some examples, a positive electrode having a sulfide-containing layer (e.g. sulfur-containing electrolyte) overlaying the positive electrode is contacted to the current collector metal layer. In some of these examples, the positive electrode having a sulfide-containing layer overlaying the positive electrode is pressed onto, or directly contacts, the current collector metal layer. The sulfur in the sulfur-containing layer may react with at least a portion of the metal of the current collector metal layer thereby forming a metal sulfide layer represented by $M_xS_y$ such that $0<x\le2$ and $0.5<y\le2$. The sulfur-containing layer may include elemental sulfur or a sulfide-containing solid electrolyte. In some examples, the method further includes depositing a lithium source on the sulfur-containing layer and transferring lithium from the lithium source through the sulfur-containing layer to contact the metal sulfide layer. In some other examples, the positive electrode having a sulfide-containing layer overlaying the positive electrode includes a lithium source in the positive electrode. In some of these examples, the method further includes contacting this lithium source including positive electrode, which also has a sulfur-containing layer, to the current collector metal layer and then transferring lithium from the positive electrode through the sulfur-containing layer to contact the metal sulfide layer. In some examples, the transferred lithium may react with the metal sulfide of the metal sulfide layer thereby forming the anolyte layer including a lithium sulfide.

In some embodiments, the method may also involve, prior to depositing the sulfur-containing layer over, or prior to contacting the sulfur-containing layer to, the current collector metal layer, removing a native oxide from a surface of the current collector metal layer. In some other embodiments, the method may also involve, prior to depositing the sulfur-containing layer over, or prior to contacting the sulfur-containing layer to, the current collector metal layer, preventing a native oxide from forming on the surface of the current collector metal layer. The surface of the current collector metal layer may be substantially free from oxygen when depositing or contacting the sulfur-containing layer. More specifically, the entire current collector metal layer may be substantially free from oxygen when depositing the sulfur-containing layer.

In some embodiments, the metal of the current collector metal layer is copper. This copper may be selected from one or more of the following: off-the-roll copper, evaporated copper, electroplated copper, and un-oxidized copper. In some embodiments, the copper is a limiting reagent when the sulfur in the sulfur-containing layer reacts with the metal of the current collector metal layer. As such, substantially all of the copper in the current collector metal layer may be consumed when the metal sulfide layer (e.g., copper sulfide) is formed. In some embodiments, a sufficient amount of lithium is transferred through the electrolyte to reduce the metal in the in situ formed metal sulfide to elemental metal.

In some embodiments, the current collector metal layer is disposed on a base layer of a current collector. The base layer may include at least one of copper, nickel, iron, lithium, aluminum, magnesium, indium, tungsten, molybdenum, alloys thereof, and combinations thereof. The composition of the current collector metal layer may be different from the composition of the base layer. In some examples, the current collector metal layer reacts with sulfur to form a metal sulfide but the base layer does not react with sulfur to form a metal sulfide. In some examples, the current collector metal layer reacts with sulfur to form a metal sulfide to a greater extent than the base layer does if the base layer reacts at all with sulfur to form a metal sulfide. In some embodiments, the current collector metal layer may be thinner than the base layer. For example, the current collector metal layer may have a thickness of between about 5 nanometers and 200 nanometers. The base layer may have a thickness between about 0.5 µm and 15 µm. In this example, most of the current collecting and current transfer functions are performed by the base layer, while the current collector metal layer is mainly used as a temporary or sacrificial layer to form the metal sulfide layer in situ that is later used to form the anolyte layer or, more specifically, lithium sulfide of the anolyte layer. In some embodiments, substantially all of the metal of the current collector metal layer is converted into the metal sulfide when or after the sulfur-containing layer is deposited on the metal layer or contacted with the metal layer. In some examples, the metal substrate includes copper, while the current collector substrate includes nickel.

In some embodiments, depositing the sulfur-containing layer includes depositing the elemental sulfur followed by depositing the sulfide-containing solid electrolyte layer over the elemental sulfur. In the same or other embodiments, the sulfur-containing layer may include one or more of the following: evaporated lithium phosphorous sulfide or, generally, lithium phosphorous sulfide (LPS), evaporated lithium silicon sulfide or, generally, lithium silicon sulfide (LSS), evaporated lithium silicon tin phosphorous sulfide or, generally, lithium silicon tin phosphorous sulfide (LSTPS), evaporated lithium tin sulfide or, generally, lithium tin sulfide (LTS), evaporated lithium arsenic tin sulfide or, generally, lithium arsenic tin sulfide (LATS), evaporated lithium germanium phosphorous sulfide or, generally, lithium germanium phosphorous sulfide (LGPS), evaporated lithium phosphorous sulfide doped with oxygen or, generally, lithium phosphorous sulfide doped with oxygen (LPSO), evaporated lithium silicon tin phosphorous sulfide doped with oxygen or, generally, lithium silicon tin phosphorous sulfide doped with oxygen (LSTPSO), and a polymer-sulfide composite. Suitable polymers for a polymer-sulfide composite include polypropylene, polyethylene oxide (PEO), polyethylene oxide poly(allyl glycidyl ether) PEO-AGE, PEO-MEEGE, polyethylene oxide 2-Methoxyethoxy)ethyl glycidyl poly(allyl glycidyl ether) PEO-MEEGE-AGE, polysiloxane, polyvinylidene fluoride (PVdF), polyvinylidene fluoride hexafluoropropylene (PVdF-HFP), and rubbers such as ethylene propylene (EPR), nitrile rubber (NPR) and Styrene-Butadiene-Rubber (SBR). Specifically, the sulfur-containing layer may include evaporated lithium phosphorous sulfide and/or lithium phosphorous sulfide (LPS). In the same or other embodiments, the sulfur-containing layer may include evaporated lithium phosphorous sulfide doped with oxygen and, or, lithium phosphorous sulfide doped with oxygen (LPSO).

In some embodiments, depositing the sulfur-containing layer on the current collector metal layer may involve evaporating the sulfur-containing layer onto the current collector metal layer. In the same or other embodiments, depositing the lithium source on the sulfur-containing layer may involve evaporating the lithium source onto the sulfur-containing layer.

In some embodiments, the lithium source may be one of the following: metallic lithium, a lithium containing active material, a lithium containing positive electrode material, an alloy, a discharged positive electrode, or combinations thereof. When the lithium containing positive material is used, this material may be one of lithium nickel cobalt aluminum oxide (NCA), lithium manganese nickel oxide (LMNO), lithium iron phosphate (LFP), lithium nickel manganese cobalt oxide (NMC), lithium cobalt oxide (LCO), and lithiated metal fluoride conversion chemistry material. In some embodiments, the lithium source is a metal fluoride characterized by the formula $Li_xMF_y$, wherein $0 \leq x \leq 3$, $0 \leq y \leq 3$, and M is selected from the group consisting of Cu, Co, Fe, Ni, Mn, and combinations thereof. Other lithium sources include those set forth in U.S. Patent Application Publication No. 2014/0170493, entitled NANOSTRUCTURED MATERIALS FOR ELECTROCHEMICAL CONVERSION REACTIONS, and filed Jun. 19, 2013 as U.S. patent application Ser. No. 13/922,214, the contents of which are incorporated by reference in their entirety; also in U.S. patent application Ser. No. 14/826,908, entitled DOPED CONVERSION MATERIALS FOR SECONDARY BATTERY CATHODES, and filed Aug. 14, 2015, the contents of which are incorporated by reference in their entirety; also in International PCT Patent Application No. PCT/US2015/17584, filed Feb. 25, 2015, entitled HYBRID ELECTRODES WITH BOTH INTERCALATION AND CONVERSION MATERIALS, the contents of which are incorporated by reference in their entirety; also in International PCT Patent Application No. PCT/US2015/067387, filed Dec. 22, 2015, entitled LITHIUM RICH NICKEL MANGANESE COBALT OXIDE, the contents of which are incorporated by reference in their entirety.

In some embodiments, the sulfur-containing layer comprises the sulfide-containing solid electrolyte layer. In these embodiments, transferring lithium from the lithium source through the sulfide-containing solid electrolyte layer and into the metal sulfide layer may involve applying a voltage between the lithium source and the metal sulfide layer. More specifically, applying the voltage may be performed in-situ in the rechargeable electrochemical cell by applying a charge potential to two terminals of the rechargeable electrochemical cell. In some examples, applying a charge potential includes discharging a cell that includes the metal sulfide and a lithium source so that a lithium ion current moves through and into the metal sulfide in order to form the lithium sulfide anolyte. In these examples, the total charge that moves through the metal sulfide to form the anolyte is dependent on the thickness of the anolyte and the value of x in $LiS_x$. In some examples, the discharged current is a constant current. In some other examples, the discharged current is a pulsed current. In certain examples, the discharged current is a continuous current. The voltage for this reaction depends on the $LiS_x$ being formed and the metal sulfide from which it is formed. In some examples, the voltage is less than 0.5V vs. Li. In some examples, the discharged current is run at room temperatures. In some other examples, the discharged current is run at temperatures above room temperature.

In some embodiments, the average thickness of the anolyte layer may be between about 5 nanometers and 200 nanometers. In some examples, the combined average concentration of lithium and sulfur in the anolyte layer is greater than the combined average concentration of lithium and sulfur in the solid electrolyte layer. In some examples, the lithium sulfide of the anolyte layer may be represented by $Li_2S$, $Li_{1.944}S$, or $LiS_x$, and wherein $0<x\leq2$. In some examples, the metal sulfide layer may have a thickness of between about 1 nanometer to 100 nanometers. In some examples, the lithium source may be a discharged cathode comprises lithium fluoride and at least one of the following metals: iron, nickel, copper, cobalt, manganese, aluminum or combinations thereof. In some examples, the metal and, or, the LiF may be nanodimensioned. In some examples, the metal and, or, the LiF may be crystalline. In some examples, the metal and, or, the LiF may be nanocrystalline. In some examples, the metal and, or, the LiF may be amorphous These and other embodiments are described further below with reference to the figures.

DETAILED DESCRIPTION OF EXAMPLE EMBODIMENTS

Figure 1A:
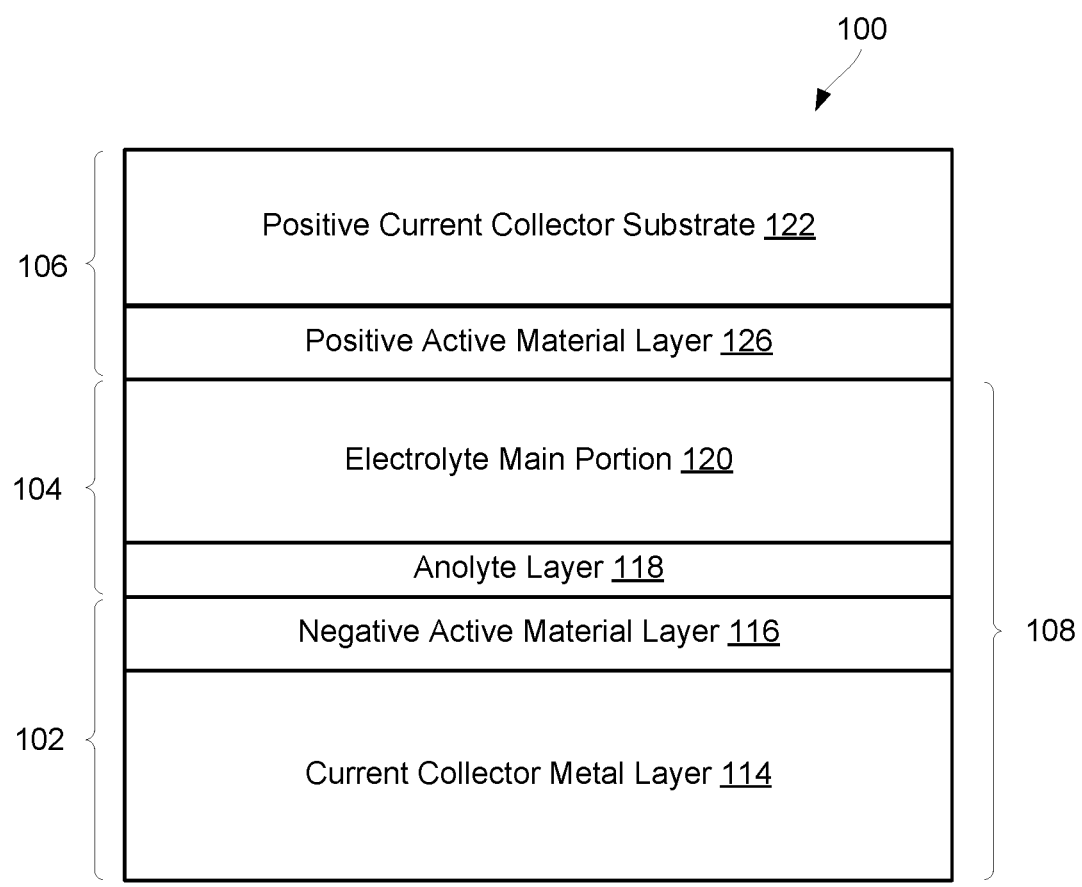
FIG. 1A is a schematic representation of an electrochemical cell illustrating relative position of various major components of the cell, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph f. In particular, the use of "step of" or "act of" in the Claims herein is not intended to invoke the provisions of 35 U.S.C. 112, Paragraph f.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Solid electrolytes provide various advantages in comparison with conventionally used liquid electrolytes. Specifically, the use of solid electrolytes may improve safety, eliminate the need for physical separators (e.g., those required for liquid electrolyte secondary batteries such as a porous, but electronically insulating polyolefin separators or biaxially stretched, non-woven polyethylene film separators). The use of solid electrolytes permits the use of lithium metal as the negative electrode without intercalation or alloying mediums in the negative electrode. The use of solid electrolytes reduces irreversible lithium loss on electrodes and allows for the use of high capacity active materials in a liquid phase (rather than insertion hosts). In general, solid electrolytes have beneficial chemical and physical stability, perform well as thin films (of about 100 micrometer and even less), and may be configured to selectively conduct particular ions while excluding electron conduction.

As used herein, the term "electrolyte," refers to an ionically conductive and electrically insulating material. Solid electrolytes, in particular, rely on ion hopping through rigid structures. Solid electrolytes may be also referred to as fast ion conductors or super-ionic conductors. Solid electrolytes may be also used for electrically insulating the positive and negative electrodes of a cell while allowing for the conduction of ions, e.g., $Li^+$, through the electrolyte. In this case, a solid electrolyte layer may be also referred to as a solid electrolyte separator.

As used herein, the phrase "positive electrode" refers to the electrode in a secondary battery towards which positive ions, e.g., $Li^+$, conduct, flow or move during discharge of the battery. As used herein, the phrase "negative electrode" refers to the electrode in a secondary battery from where positive ions, e.g., $Li^+$, conduct, flow or move during discharge of the battery. In a battery comprised of a Li-metal electrode and a conversion chemistry electrode (i.e., active material; e.g., $NiF_x$), the electrode having the conversion chemistry materials is referred to as the positive electrode. In some common usages, cathode is used in place of positive electrode, and anode is used in place of negative electrode. When a Li-secondary battery is charged, Li ions move from the positive electrode (e.g., $NiF_x$) towards the negative electrode (Li-metal). When a Li-secondary battery is discharged, Li ions move towards the positive electrode (e.g., $NiF_x$; i.e., cathode) and from the negative electrode (e.g., Li-metal; i.e., anode). As used herein, a "lithiated positive electrode" includes a positive electrode as set forth herein which includes lithium.

A solid electrolyte layer may have different portions (or sub-layers) with particular compositions and characteristics, such a portion contacting a positive electrode and another portion contacting a negative electrode. The portion contacting the positive electrode may be referred to as a catholyte or, more specifically, a catholyte layer or a catholyte sub-layer. The portion contacting the negative electrode may be referred to as an anolyte or, more specifically, an anolyte layer or an anolyte sub-layer. Specifically, the term "anolyte," refers to an ionically conductive material that is mixed with, or layered upon, or laminated to, the negative electrode. The catholyte is an ion conductive material that is mixed with, or surrounded by, positive active material (e.g., a metal fluoride optionally including lithium).

As used herein, a "catholyte" also refers to an ion conductor that is intimately mixed with, or that surrounds, or that contacts the active material (e.g., $FeF_3$). Catholytes suitable with the embodiments described herein include, but are not limited to, LSS, LTS, LXPS, LXPSO, where X is Si, Ge, Sn, As, Al, LATS, also Li-stuffed garnets, or combinations thereof, and the like. Catholytes may also be liquid, gel, semi-liquid, semi-solid, polymer, and/or solid polymer ion conductors known in the art. Catholytes include those catholytes set forth in International PCT Patent Application No. PCT/US14/38283, entitled SOLID STATE CATHOLYTE OR ELECTROLYTE FOR BATTERY USING $Li_AMP_BS_C$ (M=Si, Ge, AND/OR Sn), filed May 15, 2014, the contents of which are incorporated by reference in their entirety. Catholytes include those catholytes set forth in International PCT Patent Application No. PCT/US2014/059575, entitled GARNET MATERIALS FOR LI SECONDARY BATTERIES AND METHODS OF MAKING AND USING GARNET MATERIALS, filed Oct. 7, 2014, the contents of which are incorporated by reference in their entirety.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein "conversion chemistry material" refers to a material that undergoes a chemical reaction during the charging and discharging cycles of a secondary battery. Conversion chemistry materials useful in the present invention include, but are not limited to, LiF, Fe, Cu, Ni, $FeF_2$, $FeO_dF_{3-2d}$, $FeF_3$, $CoF_3$, $CoF_2$, $CuF_2$, $NiF_2$, where $0 \le d \le 0.5$, and the like. Exemplary conversion chemistry materials are found, for example, in U.S. Patent Publication No. 2014/0117291, filed Oct. 25, 2013, and entitled METAL FLUORIDE COMPOSITIONS FOR SELF FORMED BATTERIES, and in U.S. patent application Ser. No. 14/826,908, filed Aug. 14, 2015, entitled DOPED CONVERSION MATERIALS FOR SECONDARY BATTERY CATHODES, all of which are incorporated by reference herein in their entirety. Exemplary conversion chemistry materials are found, for example, in U.S. Patent Application Publication No. 2014/0170493, entitled NANOSTRUCTURED MATERIALS FOR ELECTROCHEMICAL CONVERSION REACTIONS, and filed Jun. 19, 2013 as U.S. patent application Ser. No. 13/922,214, the contents of which are incorporated by reference in their entirety.

As used herein, "LSS" refers to lithium silicon sulfide which can be described as $Li_2S$—$SiS_2$, Li—$SiS_2$, Li—S—Si, and/or a catholyte consisting essentially of Li, S, and Si. LSS refers to an electrolyte material characterized by the formula $Li_xSi_yS_z$ where $0.33 \le x \le 0.5$, $0.1 \le y \le 0.2$, $0.4 \le z \le 0.55$, and it may include up to 10 atomic % oxygen. LSS also refers to an electrolyte material comprising Li, Si, and S. In some examples, LSS is a mixture of $Li_2S$ and $SiS_2$. In some examples, the ratio of $Li_2S:SiS_2$ is 90:10, 85:15, 80:20, 75:25, 70:30, 2:1, 65:35, 60:40, 55:45, or 50:50 molar ratio. LSS may be doped with compounds such as $Li_xPO_y$, $Li_xBO_y$, $Li_4SiO_4$, $Li_3MO_4$, $Li_3MO_3$, $PS_x$, and/or lithium halides such as, but not limited to, LiI, LiCl, LiF, or LiBr, wherein $0<x\leq5$ and $0<y\leq5$.

As used herein, "LTS" refers to a lithium tin sulfide compound which can be described as $Li_2S$—$SnS_2$, $Li_2S$—$SnS$, Li—S—Sn, and/or a catholyte consisting essentially of Li, S, and Sn. The composition may be $Li_xSn_yS_z$ where $0.25\leq x\leq 0.65$, $0.05\leq y\leq 0.2$, and $0.25\leq z\leq 0.65$. In some examples, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In. As used herein, "LATS" refers to LTS, as used above, and further comprising Arsenic (As).

As used herein, "LXPS" refers to a catholyte material characterized by the formula $Li_aMP_bS_c$, where M is Si, Ge, Sn, and/or Al, and where $2\leq a\leq 8$, $0.5\leq b\leq 2.5$, $4\leq c\leq 12$. "LSPS" refers to an electrolyte material characterized by the formula $L_aSiP_bS_c$, where $2\leq a\leq 8$, $0.5\leq b\leq 2.5$, $4\leq c\leq 12$. Exemplary LXPS materials are found, for example, in International Patent Application No. PCT/US2014/038283, filed May 16, 2014, and entitled SOLID STATE CATHOLYTE OR ELECTROLYTE FOR BATTERY USING $LI_4MP_BS_C$ (M=Si, Ge, AND/OR Sn), which is incorporated by reference herein in its entirety. When M is Sn and Si—both are present—the LXPS material is referred to as LSTPS. As used herein, "LSTPSO," refers to LSTPS that is doped with, or has, O present. In some examples, "LSTPSO," is a LSTPS material with an oxygen content between 0.01 and 10 atomic %. "LSPS," refers to an electrolyte material having Li, Si, P, and S chemical constituents. As used herein "LSTPS," refers to an electrolyte material having Li, Si, P, Sn, and S chemical constituents. As used herein, "LSPSO," refers to LSPS that is doped with, or has, O present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO" refers to a catholyte material characterized by the formula $Li_aMP_bS_cO_d$, where M is Si, Ge, Sn, and/or Al, and where $2\leq a\leq 8$, $0.5\leq b\leq 2.5$, $4\leq c\leq 12$, $d<3$. LXPSO refers to LXPS, as defined above, and having oxygen doping at from 0.1 to about 10 atomic %. LPSO refers to LPS, as defined above, and having oxygen doping at from 0.1 to about 10 atomic %.

As used herein, "LPS," refers to an electrolyte having Li, P, and S chemical constituents. As used herein, "LPSO," refers to LPS that is doped with or has O present. In some examples, "LPSO," is a LPS material with an oxygen content between 0.01 and 10 atomic %. LPS refers to an electrolyte material that can be characterized by the formula $Li_xP_yS_z$ where $0.33\leq x\leq 0.67$, $0.07\leq y\leq 0.2$ and $0.4\leq z\leq 0.55$. LPS also refers to an electrolyte characterized by a product formed from a mixture of $Li_2S:P_2S_5$ wherein the molar ratio is 10:1, 9:1, 8:1, 7:1, 6:1 5:1, 4:1, 3:1, 7:3, 2:1, or 1:1. LPS also refers to an electrolyte characterized by a product formed from a mixture of $Li_2S:P_2S_5$ wherein the reactant or precursor amount of $Li_2S$ is 95 atomic % and $P_2S_5$ is 5 atomic %. LPS also refers to an electrolyte characterized by a product formed from a mixture of $Li_2S:P_2S_5$ wherein the reactant or precursor amount of $Li_2S$ is 90 atomic % and $P_2S_5$ is 10 atomic %. LPS also refers to an electrolyte characterized by a product formed from a mixture of $Li_2S:P_2S_5$ wherein the reactant or precursor amount of $Li_2S$ is 85 atomic % and $P_2S_5$ is 15 atomic %. LPS also refers to an electrolyte characterized by a product formed from a mixture of $Li_2S:P_2S_5$ wherein the reactant or precursor amount of $Li_2S$ is 80 atomic % and $P_2S_5$ is 20 atomic %. LPS also refers to an electrolyte characterized by a product formed from a mixture of $Li_2S:P_2S_5$ wherein the reactant or precursor amount of $Li_2S$ is 75 atomic % and $P_2S_5$ is 25 atomic %. LPS also refers to an electrolyte characterized by a product formed from a mixture of $Li_2S:P_2S_5$ wherein the reactant or precursor amount of $Li_2S$ is 70 atomic % and $P_2S_5$ is 30 atomic %. LPS also refers to an electrolyte characterized by a product formed from a mixture of $Li_2S:P_2S_5$ wherein the reactant or precursor amount of $Li_2S$ is 65 atomic % and $P_2S_5$ is 35 atomic %. LPS also refers to an electrolyte characterized by a product formed from a mixture of $Li_2S:P_2S_5$ wherein the reactant or precursor amount of $Li_2S$ is 60 atomic % and $P_2S_5$ is 40 atomic %.

As used herein, LPSO refers to an electrolyte material characterized by the formula $Li_xP_yS_zO_w$ where $0.33\leq x\leq 0.67$, $0.07\leq y\leq 0.2$, $0.4\leq z\leq 0.55$, $0\leq w\leq 0.15$. Also, LPSO refers to LPS, as defined above, that includes an oxygen content of from 0.01 to 10 atomic %. In some examples, the oxygen content is 1 atomic %. In other examples, the oxygen content is 2 atomic %. In some other examples, the oxygen content is 3 atomic %. In some examples, the oxygen content is 4 atomic %. In other examples, the oxygen content is 5 atomic %. In some other examples, the oxygen content is 6 atomic %. In some examples, the oxygen content is 7 atomic %. In other examples, the oxygen content is 8 atomic %. In some other examples, the oxygen content is 9 atomic %. In some examples, the oxygen content is 10 atomic %.

As used herein, the phrase "nanodimensioned" refers to a composite material wherein the constituent components are separated by nanodimensions. For example, a nanodimensioned composite material may include a Li-containing compound, e.g., LiF, and an Fe-containing compound, e.g., Fe, wherein the domains of Fe and the domains of LiF have median physical dimensions of approximately 1-100 nm, or 2-50 nm, or 1-10 nm, or 2-5 nm, or 5-15 nm, or 5-20 nm, or the like as measured in a TEM micrograph by identification of regions of visual contrast of different nanodomains. For example, a nanodimensioned LR-NMC may include a LR-NMC having median physical dimensions of approximately 1-100 nm, or 2-50 nm, or 1-10 nm, or 2-5 nm, or 5-15 nm, or 5-20 nm, or the like as measured in a TEM micrograph by identification of regions of visual contrast of different nanodomains.

Various solid electrolyte compositions have been tried in the past with different levels of success. One example includes lithium super ionic conductor (LISICON), which includes a family of solids with the chemical formula $Li_{2+2x}Zn_{1-x}GeO_4$. Other examples include $Li_2S$—$SiS_2$—$Li_3PO_4$ (glass electrolyte), $Li_{10}GeP_2S_{12}$, Li-β-alumina, $Li_2S$—$P_2S_5$ (glass electrolyte), $Li_{3.25}Ge_{0.25}P_{0.75}S_4$, $Li_7P_3S_{11}$, lithium phosphorus oxynitride (LiPON), and various polymer based electrolytes, just to name a few. While polymer based electrolytes have wide adoption, inorganic solid electrolytes provide benefits of single cation conduction, wide electrochemical window, and simple electrochemical reactions. Anolytes, as set forth herein, also provide benefits such as, but not limited to, preventing lithium dendrite formation during operation (charge and discharging) of a rechargeable electrochemical cell (e.g., secondary battery). Sulfide-containing solid electrolytes further standout amount other types of inorganic solid electrolytes because of their high ionic conductivity (e.g., greater than $10^{-3}$ S/cm for Li$^+$), controlled grain-boundary resistance, wide selection of composites, and ease or production (e.g., precipitation of super-ionic metastable crystalline phases from glass). In fact, lithium ion conductivity of some sulfide-containing solid electrolytes is often greater than that of conventional liquid electrolytes while retaining all benefits of solid electrolytes listed above.

However, sulfide-containing solid electrolytes are known to interact with copper when copper-containing current collectors are used. When such electrolytes come in contact with copper, copper sulfide is formed causing various negative effects.

Certain sulfide-based electrolytes are not stable when in contact with a lithium metal anode, partly due to the fact that lithium is one of the strongest reducing agents. If a sulfide-based electrolyte includes an element that is not fully reduced, this electrolyte may react when in contact with lithium metal since lithium might reduce this element which is not fully reduced to form another chemical specie.

It has been found herein that forming an anolyte layer over a negative electrode can address lithium metal instability which is associated with certain sulfide-based electrolytes. It has been found herein that forming an anolyte layer over a negative electrode can prevent the formation of lithium dendrites when the electrochemical cell is charged and discharged. Specifically, an anolyte layer may be formed that is stable to both lithium metal, on one side of the anolyte, and a main portion of the sulfide-containing solid electrolyte, on the other side of the anolyte. While the anolyte layer is a part of, or directly contacts, the electrolyte, the anolyte has different compositions than the main portion of the electrolyte in order to be stable at least to lithium metal. The anolyte layer may be sufficiently thin in comparison to the main portion of the electrolyte and may not significantly impact the overall performance characteristics (e.g., ionic conductivity) of the electrolyte described above. For example, the thickness of the anolyte layer is between about 5 nanometers and 200 nanometers. In some examples, the thickness of the anolyte is between about 5 μm and 25 μm. In some other examples, the thickness of the anolyte is between about 1 μm and 50 μm. In some examples, the thickness of the anolyte is between about 1 nm and 200 nm. In some other examples, the thickness of the anolyte is about 1 nm. In some examples, the thickness of the anolyte is about 2 nm. In some other examples, the thickness of the anolyte is about 3 nm. In some examples, the thickness of the anolyte is about 4 nm. In some other examples, the thickness of the anolyte is about 5 nm. In certain examples, the thickness of the anolyte is about 6 nm. In other examples, the thickness of the anolyte is about 7 nm. In some examples, the thickness of the anolyte is about 8 nm. In some other examples, the thickness of the anolyte is about 9 nm. In yet other examples, the thickness of the anolyte is about 10 nm. In some examples, the thickness of the anolyte is about 11 nm. In certain examples, the thickness of the anolyte is about 12 nm. In some other examples, the thickness of the anolyte is about 13 nm. In some other examples, the thickness of the anolyte is about 14 nm. In certain other examples, the thickness of the anolyte is about 15 nm. In some examples, the thickness of the anolyte is about 20 nm. In some other examples, the thickness of the anolyte is about 1 μm. In some examples, the thickness of the anolyte is about 5 μm. In some other examples, the thickness of the anolyte is about 6 μm. In some examples, the thickness of the anolyte is about 4 nm. In some other examples, the thickness of the anolyte is about 7 μm. In certain examples, the thickness of the anolyte is about 8 μm. In other examples, the thickness of the anolyte is about 9 μm. In some examples, the thickness of the anolyte is about 10 μm. In some other examples, the thickness of the anolyte is about 11 μm. In yet other examples, the thickness of the anolyte is about 12 μm. In some examples, the thickness of the anolyte is about 13 μm. In certain examples, the thickness of the anolyte is about 14 μm. In some other examples, the thickness of the anolyte is about 15 μm. In some other examples, the thickness of the anolyte is about 20 μm. In certain other examples, the thickness of the anolyte is about 25 μm. In some examples, the thickness of the anolyte is about 50 μm. In some other examples, the thickness of the anolyte is about 30 μm. In some other examples, the thickness of the anolyte is about 35 μm. In certain other examples, the thickness of the anolyte is about 40 μm. In some examples, the thickness of the anolyte is about 45 μm.

However, forming a specific layer, such as an anolyte layer, may be difficult and in many cases cost prohibitive. It has been unexpectedly found that a suitable anolyte layer may be formed in situ without significant impact to the overall cell fabrication workflow. Starting with a brief background, copper sulfide spontaneously forms on a copper substrate when contacted with a sulfide-containing solid electrolyte. While copper sulfide itself is a poor conductor of lithium ions, copper sulfide can be converted into lithium sulfide, which forms an anolyte layer. Furthermore, in some embodiments, copper sulfide can be converted into lithium sulfide formed in situ during, for example, initial cycling of an electrochemical cell. In some examples, a metal or alloy other than copper, including metal set forth herein and above, may be used. In some examples, a sulfide-containing electrolyte may be deposited directly on a copper surface of a current collector substrate. In some embodiments, the entire current collector substrate is formed from copper. Alternatively, the current collector substrate may include a thin copper layer, while the rest of the current collector substrate, which may be referred to as a base layer, may be formed from another material. In a specific example, a thin layer (e.g., between about 5 nm and 200 nanometers) of copper may be disposed on a nickel base layer. The total thickness of the current collector substrate may be between about 1 micrometer and 15 micrometers.

After the sulfide-containing electrolyte is deposited on the copper surface, at least a portion of the electrolyte reacts with copper and forms a sulfide. The reaction may be self-limiting based on the amount of copper available and/or based on the amount of electrolyte. In some examples, a specific amount of copper, substantially free of oxygen, is included as the current collector metal layer on top of the base layer so as to limit the amount of copper sulfide which forms when in contact with a sulfide-containing electrolyte layer. As noted above, a thin layer of copper may be positioned on a base layer, which may not react with the electrolyte (at least as readily as copper). In some embodiments, the amount of electrolyte initially deposited on, or contacted to, the copper surface may be controlled to form a particular amount of copper sulfide. Additional electrolyte may be added during later operations. In some embodiments, the amount of sulfur initially deposited on, or contacted to, the copper surface may be controlled to form a particular amount of copper sulfide. Additional electrolyte may be added during later operations. In some embodiments, the stack including the sulfide-containing electrolyte on the copper surface may be annealed to accelerate copper sulfide formation. In some examples, additionally annealing is used to increase the thickness of the metal sulfide. In some examples, a cooling protocol is used to decrease the thickness of the metal sulfide. When lithium is conducted or transferred through or into the metal sulfide to form the lithium sulfide anolyte, the lithium ions may diffuse faster at elevated temperatures.

In an example, the formation of copper sulfide when copper contacts a sulfide-based electrolyte is a chemical reaction. In some of these examples, when lithium is cycled through to form lithium sulfide from the copper sulfide, the formation of lithium sulfide is an electrochemical reaction.

Copper sulfide formed between the sulfide-containing electrolyte and current collector substrate may be then converted into lithium sulfide by introducing lithium into the copper sulfide interface layer. Lithium may be introduced, for example, by initial cycling of the battery including the negative electrode assembly formed by adding the sulfide-containing electrolyte and current collector substrate. In some examples, the introduction of lithium is done gradually, e.g., at slow charge rate for the initial 10% state of charge of the initial charge for the electrochemical cell. In comparison to copper sulfide, lithium sulfide is a better conductor of lithium ions and is operable as a part of the overall electrolyte. This lithium sulfide layer may be referred to as an anolyte because of its interface with the negative electrode. Copper may be released during formation of lithium sulfide and may become a part of the current collector substrate or may be incorporated into the anolyte layer. When additional lithium is introduced to the negative electrode during cycling, this lithium is transferred through the lithium sulfide anolyte layer in a form of lithium ions and then deposited as lithium metal in between the anolyte layer and the current collector substrate.

While the above example refers to copper, one having ordinary skills in the art would understand that other metals may also be used to form temporary sulfide structures prior to being recovered when the anolyte layer is formed. Some examples of these other metals include nickel, iron, lithium, aluminum, molybdenum, tungsten, magnesium, indium, alloys thereof, multilayers thereof, and combinations thereof.

In another example, copper may be deposited (e.g., evaporated) onto the surface of a sulfide-containing electrolyte. This process may be performed before combining (e.g., laminating) the sulfide-containing electrolyte with the negative electrode or, more specifically, with the current collector substrate of the negative electrode. The deposited copper reacts with the sulfide-containing electrolyte to copper sulfide. Lithium is later added to copper sulfide to form lithium sulfide and release copper. Lithium may be added during initial cycling of the cell containing this assembly.

In yet another example, a layer of sulfur may be formed over the copper surface of the current collector substrate prior to depositing an electrolyte layer. This sulfur reacts with copper forming copper sulfide that is later converted into lithium sulfide. Addition of the sulfur layer helps to avoid depletion of sulfur in the electrolyte and, in some embodiments, allows using electrolytes that do not contain sulfides but that are still reactive with copper. Examples of electrolytes that do not contain sulfides include, for example, ceramic based electrolytes, such as but not limited to Li-stuffed garnet electrolytes. As used herein, "Li-stuffed garnet" refers to oxides that are characterized by a crystal structure related to a garnet crystal structure. Li-stuffed garnets include compounds having the formula $Li_aLa_bM'_cM''_dZr_eO_f$, $Li_aLa_bM'_cM''_dTa_eO_f$, or $Li_aLa_bM'M''_dNb_eO_f$, where $4<a<8.5$, $1.5<b<4$, $0\le c\le 2$, $0\le d\le 2$; $0\le e<2$, $10<f<13$, and M' and M" are, independently in each instance, selected from Al, Mo, W, Nb, Sb, Ca, Ba, Sr, Ce, Hf, Rb, or Ta, or $Li_aLa_bZr_cAl_dMe''_eO_f$, where $5<a<7.7$, $2<b<4$, $0<c\le 2.5$, $0\le d<2$, $0\le e<2$, $10<f<13$ and Me" is a metal selected from Nb, Ta, V, W, Mo, or Sb and as described herein. "Garnets," as used herein, also include those garnets described above that are doped with $Al_2O_3$. Garnets, as used herein, also include those garnets described above that are doped so that $Al^{3+}$ substitutes for $Li^+$. As used herein, Li-stuffed garnets, and garnets, generally, include, but are not limited to, $Li_{7.0}La_3(Zr_{t1}+Nb_{t2}+Ta_{t3})O_{12}+0.35Al_2O_3$, wherein (t1+t2+t3=subscript 2) so that the La:(Zr/Nb/Ta) ratio is 3:2. Also, garnet and lithium-stuffed garnets as used herein can include $Li_xLa_3Zr_2O_{12}+yAl_2O_3$, where x ranges from 5.5 to 9 and y ranges from 0 to 1. In some embodiments, x is 7 and y is 1.0. In some embodiments, x is 7 and y is 0.35. In some embodiments, x is 7 and y is 0.7. In some embodiments x is 7 and y is 0.4. Also, garnets as used herein can include $Li_xLa_3Zr_2O_{12}+yAl_2O_3$. Exemplary lithium-stuffed garnets are found in the compositions set forth in International Patent Application Nos. PCT/US2014/059575 and PCT/US2014/059578, filed Oct. 7, 2014, entitled GARNET MATERIALS FOR LI SECONDARY BATTERIES AND METHODS OF MAKING AND USING GARNET MATERIALS.

As such, provided are negative electrode assemblies containing lithium sulfide anolyte layers, solid state electrochemical cells including these assemblies, and methods of forming thereof. An anolyte layer may be disposed over a metal layer of a current collector and may be used to separate the current collector from the rest of the electrolyte. The metal layer may include copper (as in the examples presented above), nickel, iron, lithium, aluminum, magnesium, molybdenum, tungsten, indium, alloys thereof, multilayers thereof, and combinations thereof. The metal of this metal layer temporarily forms a metal sulfide during fabrication of the electrode assembly. Specifically, a sulfur containing layer, such as a solid sulfide-containing electrolyte or a sacrificial sulfur layer, is formed on the metal layer. Sulfur from this sulfur containing layer reacts with the metal of the current collector and forms a temporary metal sulfide layer. This metal sulfide may be undesirable for performance of the battery. Lithium is later added to the metal sulfide layer converting the metal sulfide into lithium sulfide and releasing metal. As such, the metal sulfide is only present temporarily. The lithium sulfide structure is operable as a part of the electrolyte as it is capable of transporting lithium ions. It may be referred to as an anolyte layer. During operation of the electrochemical cells, the anolyte layer separates the remaining electrolyte, which has a different composition than the anolyte layer, from the metal layer and lithium formed on the metal layer during cycling.

Examples of Electrochemical Cells Having Lithium Sulfide Anolyte Layers

FIG. 1A is a schematic representation of electrochemical cell 100 illustrating relative position of its major components, in accordance with some embodiments. Specifically, electrochemical cell 100 includes negative electrode 102, positive electrode 106, and electrolyte 104 disposed between negative electrode 102 and positive electrode 106 and providing ionic communication between negative electrode 102 and positive electrode 106. A combination of negative electrode 102 and electrolyte 104 may be referred to as negative electrode assembly 108. Negative electrode 102 may be sometimes referred to as an anode, while positive electrode 106 may be sometimes referred to as a cathode.

Negative electrode 102 includes current collector metal layer 114 and, in some embodiments, negative active material layer 116. It should be noted that negative active material layer 116 may be formed during cycling (e.g., charging) of electrochemical cell 100 or, more specifically, during charging of electrochemical cell 100. One having ordinary skills in the art would understand that the size of negative active material layer 116 may change during cycling. For example, negative electrode 102 may be initially fabricated without any negative active material layer 116 and this layer may be formed during initial cycling. Furthermore, negative active material layer 116 may be completely removed from negative electrode when electrochemical cell 100 is fully discharges. In some embodiments, negative active material layer 116 includes lithium metal, lithium silicide, lithium-tin, or any other high capacity, low voltage materials that alloy with lithium. Furthermore, negative active material layer 116 may include one or more lithium intercalation materials, such as graphite. Other examples include tin, magnesium, germanium, silicon, oxides of these materials, and the like. Negative active material layer 116 may be porous material that allows lithium plating into the pores, thereby relieving the swelling stress. For examples, pores may be formed by carbon nanotubes, carbon buckyballs, carbon fibers, activated carbon, graphite, porous silicon, aerogels, zeolites, xerogels, at the like.

Current collector metal layer 114 may include copper, nickel, iron, lithium, aluminum, stainless steel, magnesium, tungsten, molybdenum, indium, alloys thereof, bilayers thereof, multilayers thereof, and combinations thereof. In some embodiments, current collector metal layer 114 includes copper. In some embodiments, current collector metal layer 114 includes a copper containing alloy rather than a part of the pure copper.

Figure 1B:
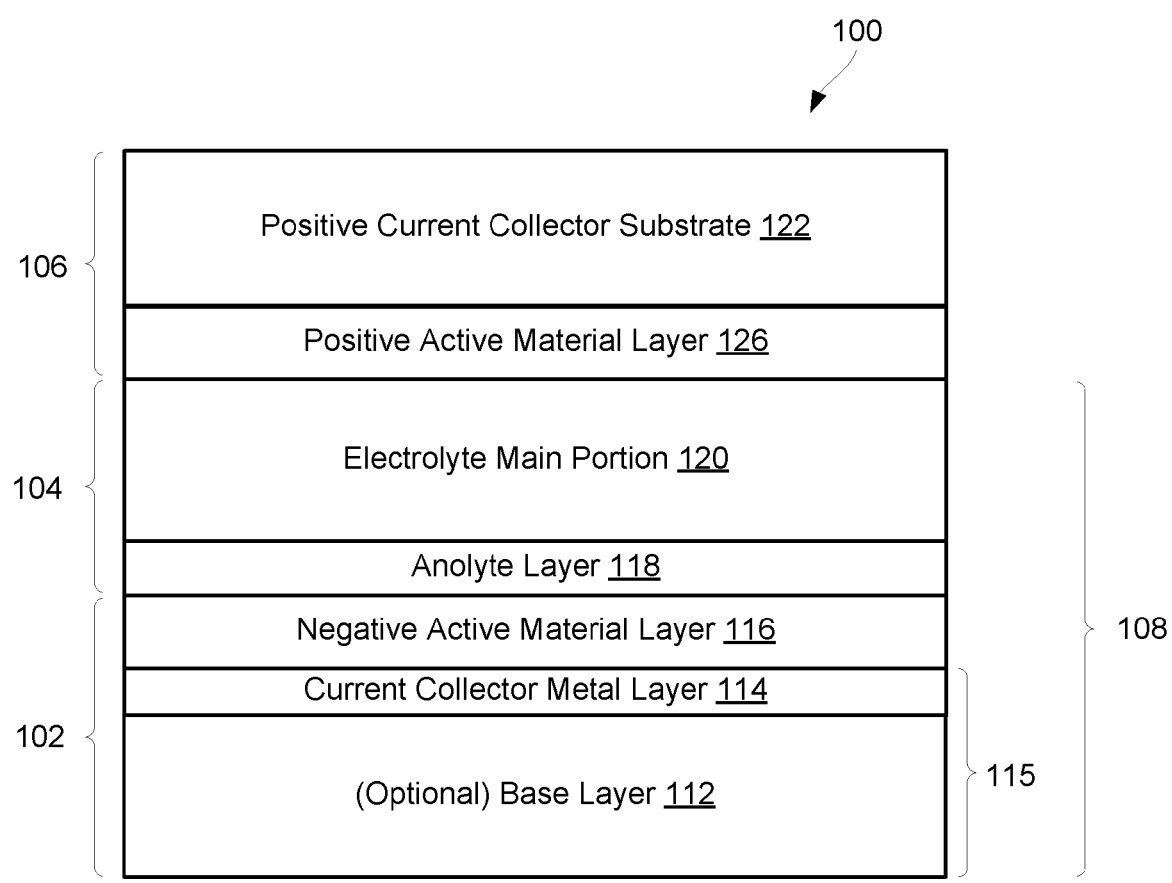
FIG. 1B is a schematic representation of another electrochemical cell having a different kind of a current collector substrate, in accordance with some embodiments.

Current collector metal layer 114 may represent an entire current collector substrate of negative electrode 102 (as, for example, shown in FIG. 1A) or a portion of the current collector substrate (as, for example, shown in FIG. 1B). Specifically, FIG. 1B illustrates current collector substrate 115 that includes current collector metal layer 114 and base layer 112. This type of current collector substrate 115 may be referred to as a bilayer current collector. Base layer 112 may have a material (e.g., a metal) that is different from the metal of current collector metal layer 114. While the metal of current collector metal layer 114 may form a metal sulfide when forming anolyte layer 118 (as further described below with reference to FIG. 2), the metal of base layer 112 may be substantially inert to sulfur and may not form sulfides as easily as current collector metal layer 114. The respective affinity to sulfur, or tendency to react with sulfur, for the current collector metal layer 114 and base layer 112, is related to, and characterized by, the enthalpy of formation, or the Gibbs energy of formation, of the metal sulfide. For example, the metal of current collector metal layer 114 may be copper, while the metal of base layer 112 may be nickel. In some other examples, the metal of current collector metal layer 114 may be copper, while the metal of base layer 112 may be aluminum. In some other examples, the metal of current collector metal layer 114 may be nickel, while the metal of base layer 112 may be aluminum. In some other examples, the metal of current collector metal layer 114 may be copper or nickel, while the metal of base layer 112 may be a polymer having a metal coating thereupon. In general, base layer 112 may include iron, lithium, aluminum, magnesium, tungsten, molybdenum, indium, alloys thereof, multilayers thereof, or combinations thereof.

When copper is used for current collector metal layer 114, the copper may be substantially free from oxygen. For example, off-the-roll copper, evaporated copper, electroplated copper, and/or un-oxidized copper may be used. For example, electroplated copper may supplied by Oak Mitsui in Japan (e.g., part number TLB-DS 9.5 u 8" wide roll). In some examples, the copper used has no native oxide. Copper that has no native oxide reacts with sulfur far more readily than copper that has an oxide on the surface of the copper. Furthermore, various techniques may be used to remove oxygen, which may be present, for example, as a native oxide, from current collector metal layer 114. As further described below with reference to FIG. 2, this oxygen removal may be performed prior to forming any structures on the surface of current collector metal layer 114.

In bilayer current collector embodiments, as, for example shown in FIG. 1B, the thickness of current collector metal layer 114 may be between about 5 nanometers and 200 nanometers or, more specifically, between about 10 nanometers and 50 nanometers or even between about 10 nanometers and 20 nanometers. The thickness of base layer 112 may be between about 1 micrometer and 15 micrometers to provide sufficient electrical conductivity between negative electrode material layer 116 and external terminals connected to current collector substrate 115. As such, the thickness of base layer 112 may depend on charge and discharge currents of electrochemical cell.

The thickness of current collector metal layer 114 may be selected to control the amount of metal sulfide during fabrication of negative electrode assembly 108 as further described below with reference to FIG. 2. Specifically, most if not all of current collector metal layer 114 in these bilayer current collector embodiments may be first consumed during formation of a temporary sulfide layer. This sulfide is later converted into anolyte layer 118. As such, the thickness of current collector metal layer 114 may be used to actually control the thickness of anolyte layer 118.

When current collector metal layer 114 is used without a base layer as, for example, is illustrates in FIG. 1A, the thickness of such current collector metal layer 114 may be between about 1 micrometer and 15 micrometers. The thickness considerations are similar to the thickness of base layer 112 described above with reference to the bilayer current collector embodiments, e.g., current conduction.

Positive electrode 106 may include positive active material layer 126 and positive current collector substrate 122. Similar to the negative active material layer 116 described above, at least a portion of positive active material layer 126 is transferred between negative electrode 102 and positive electrode 106 during electrochemical cycling of cell 100. The initial material for this transfer may be provided on negative electrode 102, positive electrode 106, or both. In some embodiments, positive active material layer 126 may include lithium that is used to cover metal sulfide into lithium sulfide and form anolyte layer 118.

Positive current collector substrate 122 is used to transmit electrical current between positive active material layer 126 and cell terminals during cycling of cell 100. Furthermore, positive current collector substrate 122 may be used for mechanical support of positive active material layer 126. Various conductive metals, such as aluminum, nickel, iron, and the like may be used for positive current collector substrate 122.

Positive active material layer 126 may include lithium nickel cobalt aluminum oxide (NCA), lithium manganese nickel oxide (LMNO), lithium iron phosphate (LFP), lithium nickel manganese cobalt oxide (NMC), and/or lithium cobalt oxide (LCO). Other positive active material layer include, but are not limited to, lithiated metal fluorides, e.g., $Li_xFeF_y$, $Li_xCuF_y$, or $Li_xNiF_y$, wherein x and y range from 0 to 3.

Electrolyte 104 includes anolyte layer 118 and electrolyte main portion 120. Anolyte layer 118 is also a portion of negative electrode assembly 108 as, for example, shown in FIGS. 1A and 1B. Anolyte layer 118 may be disposed over current collector metal layer 114. During fabrication of negative electrode assembly 108, anolyte layer 118 may be in physically contact with current collector metal layer 114, e.g., prior to or during initial charging of electrochemical cell 100. Subsequently, negative active material layer 116 may be formed between current collector metal layer 114 and anolyte layer 118 by passing ions through anolyte layer 118 and reducing these ions at of negative electrode assembly 108.

Anolyte layer 118 may include a lithium sulfide compound, which may be represented by $LiS_x$, such that $0<x\leq2$. More specifically, the lithium sulfide of anolyte layer 118 may be represented by $Li_2S$ or by $Li_{1.944}S$. In some embodiments, anolyte layer 118 may include traces of metal that form current collector metal layer. However, anolyte layer 118 may generally free from metal sulfides other than lithium sulfides.

In addition to anolyte layer 118, electrolyte 104 also includes electrolyte main portion 120, which may be is a sulfide-containing solid electrolyte. The thickness of electrolyte main portion 120 may be much greater than that of anolyte layer 118 such that characteristics of main portion 120 dominate characteristics of anolyte layer 118 in the overall performance of electrolyte 104. In some embodiments, the thickness of anolyte layer 118 is between about 5 nanometers and 200 nanometers or, more specifically, between about 10 nanometers and 50 nanometers or even between about 10 nanometers and 20 nanometers. In some examples, the electrolyte has a higher ionic conductivity than the anolyte does. Because of this, it is generally beneficial for the thickness of the anolyte to be much thinner than the thickness of the electrolyte so that the overall ionic conductivity of the electrolyte-anolyte combination is suitable for most battery applications. The thickness of electrolyte main portion 120 may be between about 10 nm to 100 microns.

Electrolyte main portion 120 may include at least one of the following elements in addition to sulfur and lithium: lithium, phosphorous, silicon, germanium, arsenic, and tin. The average concentration of this additional element in main portion 120 may be greater than that in anolyte layer 118. In some embodiments, main portion 120 includes phosphorous. In the same or other embodiments, main portion 120 includes silicon. Furthermore, main portion 120 may include germanium. In some embodiments, main portion 120 includes arsenic. Furthermore, main portion 120 may include tin. The relative compositions of main portion 120 and anolyte layer 118 is further described below with reference to FIG. 1C. For purposes of this disclosure, the concentration value represents a mole fraction as determined by an empirical analytical technique, such as energy-dispersive X-ray spectroscopy (EDX), inductively coupled plasma (ICP), or X-Ray photoelectron spectroscopy (XPS)/X-ray fluorescence analysis (XRF).

Electrolyte 104 may include evaporated lithium phosphorous sulfide or, generally, lithium phosphorous sulfide (LPS), evaporated lithium silicon sulfide or, generally, lithium silicon sulfide (LSS), evaporated lithium silicon tin phosphorous sulfide or, generally, lithium silicon tin phosphorous sulfide (LSTPS), evaporated lithium tin sulfide or, generally, lithium tin sulfide (LTS), evaporated lithium arsenic tin sulfide or, generally, lithium arsenic tin sulfide (LATS), evaporated lithium germanium phosphorous sulfide or, generally, lithium germanium phosphorous sulfide (LGPS), evaporated lithium phosphorous sulfide doped with oxygen or, generally, lithium phosphorous sulfide doped with oxygen (LPSO), evaporated lithium silicon tin phosphorous sulfide doped with oxygen or, generally, lithium silicon tin phosphorous sulfide doped with oxygen (LSTPSO), and a polymer-sulfide composite. More specifically, electrolyte 104 may include evaporated lithium phosphorous sulfide or, generally, and/or lithium phosphorous sulfide (LPS). In the same or other examples, electrolyte 104 may include evaporated lithium phosphorous sulfide doped with oxygen and/or lithium phosphorous sulfide doped with oxygen (LPSO). Electrolyte 104 may have a relatively high lithium ion conductivity, e.g., of at least about $10^{-6}$ Siemens/centimeter or even at least about $10^{-3}$ Siemens/centimeter.

Figure 1C:
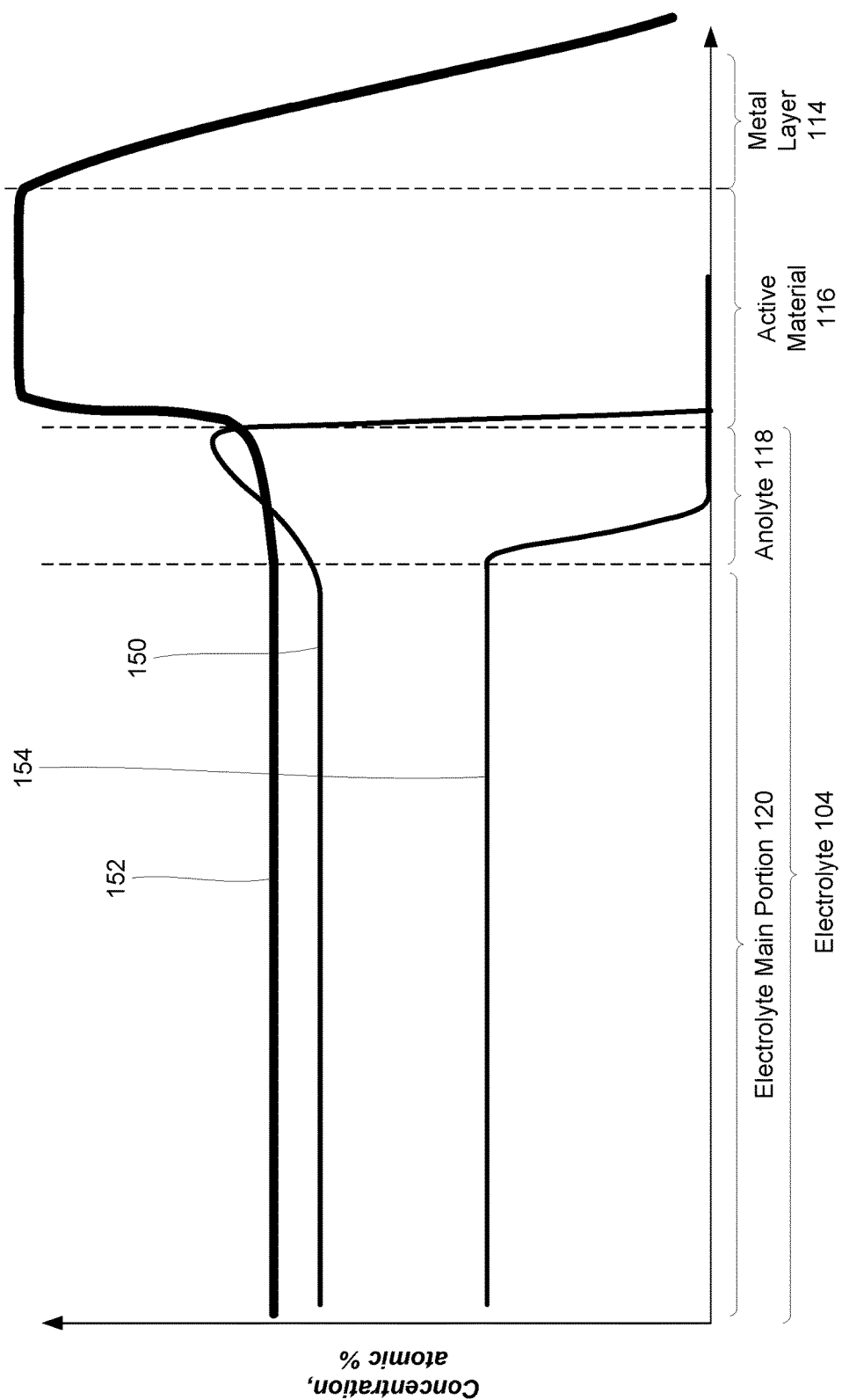
FIG. 1C is a schematic representation of distribution of various materials within an electrode assembly, in accordance with some embodiments.

The composition at different locations of negative electrode assembly 108 will now be described with reference to FIG. 1C. Specifically, FIG. 1C is a schematic representation of concentration profiles 150, 152, and 154 of three materials, in accordance with some embodiments. While only three profiles 150, 152, and 154 corresponding to three materials are shown, one having ordinary skills in the art would appreciated that concentrations of any number of materials can be varied in a similar manner. In this example, profile 150 represents sulfur concentration, profile 152 represent lithium concentration, while profile 154 represent the concentration of some other material, such as phosphorous, silicon, germanium, arsenic, and/or tin. For simplicity, profile 154 will be referred to as a profile representing the concentration of phosphor, but this example is not limiting. In general, the material corresponding to profile 154 depends on composition of electrolyte main component 120 with some non-limiting examples presented above. Furthermore, it should be noted that the boundaries of different components of negative electrode assembly 108 are represented schematically.

In electrolyte main portion 120, profiles 150, 152, and 154 are substantially constant until approaching anolyte layer 118. Constant profiles 150, 152, and 154 indicate that the composition of electrolyte main portion 120 is substantially uniform away from its interface with anolyte layer 118. Transitioning into anolyte layer 118, the concentration of lithium (profile 152) may remain substantially the same. Alternatively, the concentration of lithium may increase or decrease substantially the same depending on the composition of electrolyte main portion 120. For example, the composition of electrolyte main portion 120 may be $Li_7P_3S_{11}$ (the concentration of lithium is about 33 atomic %), while the composition of anolyte layer 118 may be $Li_2S$ (the concentration of lithium is about 66 atomic %). Specifically, the average concentration of lithium in anolyte layer 118 may be greater than the average concentration of lithium in electrolyte 104. As such, lithium may replace other components of electrolyte besides sulfur and lithium that are present at lower concentrations in anolyte layer 118 than in electrolyte main portion 120 (e.g., phosphor in $Li_7P_3S_{11} \Rightarrow Li_2S$ example). It should be noted that the composition of a particular component is described in the context of the average composition and, more specifically, the average composition not accounting various interface regions.

In some examples, concentration of Li may decrease going from the electrolyte to the anolyte. For example, the anolyte composition may be characterized by $LiS_x$ and at the high end of the 0<x<2 range, wherein Li would be 33 atomic %. If the electrolyte is characterized by $Li_3PS_4$, the electrolyte would be 37.5 atomic % Li such that the Li concentration decreases in the anolyte with respect to the Li concentration in the electrolyte.

The concentration of sulfur (profile 150) may increase from electrolyte main portion 120 into anolyte layer 118 as for example, shown in FIG. 1C. For example, sulfur may replace other components of electrolyte besides sulfur and lithium that are present at lower concentrations in anolyte layer 118 than in electrolyte main portion 120. Specifically, the average concentration of sulfur in anolyte layer 118 may be greater than the average concentration of sulfur in electrolyte 104. Alternatively, the concentration of sulfur may decrease from electrolyte main portion 120 into anolyte layer 118 as for example. In the $Li_7P_3S_{11}$=>$Li_2S$ example presented above, the concentration of sulfur decreases from 52 atomic % (in $Li_7P_3S_{11}$ representing electrolyte main portion 120) to 33 atomic % (in $Li_2S$ representing anolyte layer 118). In this example, the sulfur concentration decrease is compensated by the significant increase in the lithium concentration.

Regardless of individual concentration profiled of lithium and sulfur, the combined average concentration of lithium and sulfur in anolyte layer 118 may be greater than the combined average concentration of lithium and sulfur in overall electrolyte 104. This concentration relationship may be due to the fact that electrolyte 104 may include other components that are not present or present at lower concentrations in anolyte layer 118. In other words, lithium and sulfur in anolyte layer 118 may collectively displace other components. In some embodiments, the combined average concentration of lithium and sulfur in anolyte layer 118 is at least 90 atomic % or even at least about 95 atomic % or at least about 98 atomic %.

FIG. 1C illustrates that profile 154 representing elements other than lithium or sulfur effectively drops down to the zero level in anolyte layer 118 (away from the interface with electrolyte main portion 120). In this example, anolyte layer 118 may be formed substantially from lithium and sulfur. In some embodiments, the concentration of other components (besides sulfur and lithium) in anolyte layer 118 may be less than 10 atomic % or, more specifically, less than 5 atomic %, or even less than 1atomic %. Retaining lithium and sulfur in anolyte layer 118 while eliminating other components yields anolyte layer 118 that is still high conductive to lithium ions yet inert to lithium metal and current collector substrate material.

Still, in some embodiments, anolyte layer 118 may include other components besides lithium and sulfur, which may be residual components or contaminants. For example, anolyte layer 118 may include a metal that forms current collector metal layer 114, such as copper, iron, and/or nickel. The concentration of this metal in the anolyte layer may be substantially less than the concentration of, for example, lithium.

Moving further to the right in FIG. 1C, negative active material 116 may include predominantly lithium as shown by a sharp increase in profile 152 representing the lithium concentration and a sharp drop to the zero level of profile 150 representing the sulfur concentration. In this example, negative active material 116 is lithium metal. However, other active materials may be used as well as described above in this disclosure. Some examples of these other materials include indium alloys, tin alloys, germanium alloys, silicon alloys, and the like. Progressing to current collector metal layer 114 in FIG. 1C, profile 152 sharply drops to the zero level as substantially no lithium alloys with materials of the current collector substrate.

Processing Examples

Figure 2:
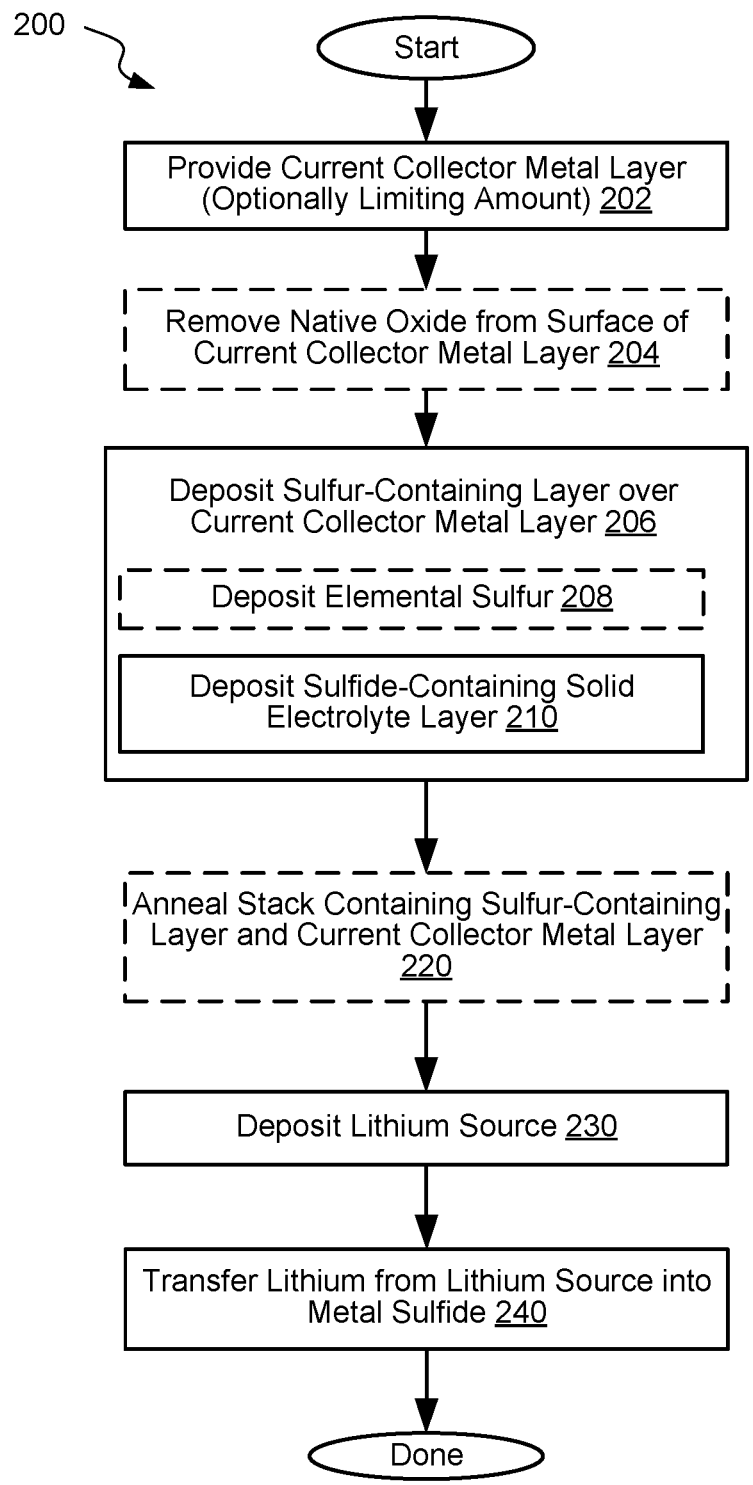
FIG. 2 is a process flowchart corresponding to a method of forming an anolyte layer on a negative electrode of a rechargeable electrochemical cell, in accordance with some embodiments. Boxes with solid lines are required steps, and boxes with hash-mark lines are optional steps.

FIG. 2 is a process flowchart corresponding to method 200 of forming an anolyte layer on a negative electrode of a rechargeable electrochemical cell, in accordance with some embodiments. Method 200 may commence with providing a substrate having a current collector metal layer during operation 202. Various examples of current collector metal layers are described above with reference to FIGS. 1A and 1B. In some embodiments, the current collector metal layer includes at least one of the following metals: copper, nickel, iron, lithium, aluminum, magnesium, indium, alloys thereof, multilayers thereof, and combinations thereof. More specifically, the current collector metal layer may include copper (or a copper alloy) at least on the surface of the layer that later receives a sulfur containing layer. The current collector metal layer may be used as an entire substrate or may be disposed on a base layer as described above with reference to FIGS. 1A and 1B.

Figure 3A:
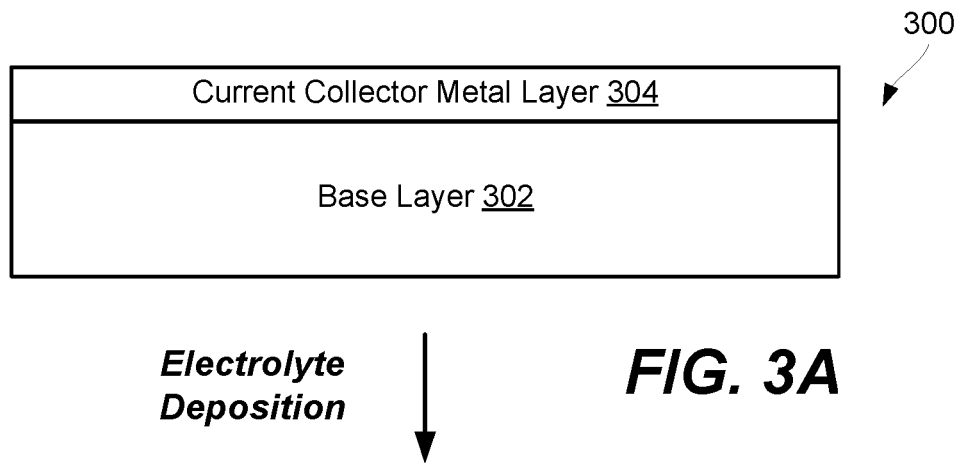
FIGS. 3A-3E illustrate various stages of the method of FIG. 2, in accordance with some embodiments.

FIGS. 3A-3E illustrate components, subassemblies, and complete assemblies at various stages during method of FIG. 2, in accordance with some embodiments. Specifically, FIG. 3A illustrates an example of substrate 300 that may be provided during operation 202. In this example, substrate 300 includes base layer 302 and current collector metal layer 304. The composition of current collector metal layer 304 may be different from the composition of base layer 302. Base layer 302 may include at least one of copper, nickel, iron, lithium, aluminum, magnesium, indium, alloys thereof, and combinations thereof. Current collector metal layer 304 may include copper. In some embodiments, current collector metal layer 304 may be thinner than base layer 302. For example, current collector metal layer 304 may have a thickness of between about 5 nanometers and 200 nanometers. Base layer 302 may have a thickness between about 1 micrometer and 15 micrometers. In this example, most of the current collecting and current transfer functions are performed by base layer 302. Current collector metal layer 304 may be used as a temporary layer to form the metal sulfide layer as further described below. The metal sulfide is then used to form the anolyte layer or, more specifically, lithium sulfide of the anolyte layer. These operations are also further described below. It should be noted that the thickness of current collector metal layer 304 may be used to control the thickness of the anolyte layer when the metal sulfide formation is limited by the amount of material in current collector metal layer 304. Additional features of suitable substrates are also described above with reference to FIGS. 1A and 1B.

Returning to FIG. 2, in some embodiments, method 200 may proceed with removing a native oxide from the surface of the current collector metal layer during optional operation 204. Operation 204 is performed prior to depositing the sulfur-containing layer over this current collector metal layer. In some examples, prior to depositing the sulfur-containing layer, the metal layer can be polished (i.e., mechanical abrasion) to remove any native oxide. In some other examples, prior to depositing the sulfur-containing layer, the metal layer can be heat treated in a reducing atmosphere (atmosphere including $H_2$). In other, an acid etching step may be used to remove any native oxide. In any of these steps, the steps may be performed in a controlled atmosphere (e.g., low humidity, low oxygen, high nitrogen, mostly if not 100% Argon/$H_2$, or mostly if not 100% Argon).

As further described below with reference to FIGS. 4B and 4C, the native oxide or, more generally, oxygen in the current collector metal layer may later prevent formation of metal sulfides thereby negatively impacting subsequent formation of the anolyte layer. The removal of the native oxide and/or providing the current collector metal layer that is substantially free from oxygen (e.g., off-the-roll copper, evaporated copper, electroplated copper, and un-oxidized copper.) and preventing the native oxide from forming on the surface of the current collector metal layer ensures controlled formation of metal sulfides from the metal of the current collector metal layer. In some embodiments, when a sulfur-containing layer is later deposited onto the current collector metal layer, the surface of the current collector metal layer may be substantially free from oxygen when depositing the sulfur-containing layer. More specifically, the entire current collector metal layer may be substantially free from oxygen when depositing the sulfur-containing layer.

Method 200 may proceed with depositing a sulfur-containing layer onto the current collector metal layer during operation 206. The sulfur-containing layer deposited during operation 206 may include elemental sulfur and/or a sulfide-containing solid electrolyte. Specifically, operation 206 may include depositing elemental sulfur during optional operation 208, depositing the sulfide-containing solid electrolyte during operation 210, or both operations 208 and 210. When both 208 and 210 are employed, operation 208 occurs before operation 210. For example, depositing the sulfur-containing layer during operation 206 includes depositing the elemental sulfur during operation 208 followed by depositing the sulfide-containing solid electrolyte layer over the elemental sulfur during operation 210. In some embodiments, depositing the sulfur-containing layer on the current collector metal layer may involve evaporating the sulfur-containing layer onto the current collector metal layer. In some examples, sulfur is evaporated from a solid sulfur precursor. In some of these examples, the evaporation occurs in a high vacuum environment (e.g., pressure is less than 1e-4 torr). In some of these examples, the thickness of deposited sulfur is less than 200 nm.

When the sulfur-containing layer is a sulfide-containing solid electrolyte that is later used in a cell, operation 206 may be viewed as in situ processing as it is performed during a normal fabrication of an electrochemical cells or, more specifically, while forming a sub-assembly including a solid electrolyte and negative electrode.

The sulfur-containing layer formed during operation 206 may include one or more of the following: evaporated lithium phosphorous sulfide or, generally, lithium phosphorous sulfide (LPS), evaporated lithium silicon sulfide or, generally, lithium silicon sulfide (LSS), evaporated lithium antimony tin sulfide or, generally, lithium antimony tin sulfide (LATS), evaporated lithium silicon tin phosphorous sulfide or, generally, lithium silicon tin phosphorous sulfide (LSTPS), evaporated lithium tin sulfide or, generally, tin sulfide (LTS), evaporated lithium arsenic tin sulfide or, generally, lithium arsenic tin sulfide (LATS), evaporated lithium germanium phosphorous sulfide or, generally, lithium germanium phosphorous sulfide (LGPS), evaporated lithium phosphorous sulfide doped with oxygen or, generally, lithium phosphorous sulfide doped with oxygen (LPSO), evaporated lithium silicon tin phosphorous sulfide doped with oxygen or, generally, lithium silicon tin phosphorous sulfide doped with oxygen (LSTPSO), and a polymer-sulfide composite. Specifically, the sulfur-containing layer may include evaporated lithium phosphorous sulfide or, generally, and/or lithium phosphorous sulfide (LPS). In the same or other embodiments, the sulfur-containing layer may include evaporated lithium phosphorous sulfide doped with oxygen or, generally, lithium phosphorous sulfide doped with oxygen (LPSO). In some examples, the sulfur-containing layer may include $(20-60)Li_2S-(20-60)B_2S_3-(0-50)LiX$, wherein X is a halogen selected from F, Cl, I, B, or combinations thereof. In some examples, the sulfide-containing solid electrolyte is $(20-60)Li_2S-(20-60)B_2S_3-(0-50)LiI$.

As used herein, evaporated sulfides can be evaporated, for example, by plasma vapor deposition methods (PVD), sputtering, evaporation, or chemical vapor deposition (CVD)

In one example, the sulfur-containing layer formed during operation 206 may include evaporated lithium phosphorous sulfide. In another example, the sulfur-containing layer formed during operation 206 may include evaporated lithium phosphorous sulfide. In another example, the sulfur-containing layer formed during operation 206 may include lithium phosphorous sulfide (LPS). In another example, the sulfur-containing layer formed during operation 206 may include evaporated lithium silicon sulfide. In another example, the sulfur-containing layer formed during operation 206 may include lithium silicon sulfide (LSS). In another example, the sulfur-containing layer formed during operation 206 may include evaporated lithium silicon tin phosphorous sulfide. In another example, the sulfur-containing layer formed during operation 206 may include lithium silicon tin phosphorous sulfide (LSTPS). In another example, the sulfur-containing layer formed during operation 206 may include evaporated lithium tin sulfide. In another example, the sulfur-containing layer formed during operation 206 may include lithium tin sulfide (LTS). In another example, the sulfur-containing layer formed during operation 206 may include evaporated lithium arsenic tin sulfide. In another example, the sulfur-containing layer formed during operation 206 may include lithium arsenic tin sulfide (LATS). In another example, the sulfur-containing layer formed during operation 206 may include evaporated lithium germanium phosphorous sulfide. In another example, the sulfur-containing layer formed during operation 206 may include lithium germanium phosphorous sulfide (LGPS). In another example, the sulfur-containing layer formed during operation 206 may include evaporated lithium phosphorous sulfide doped with oxygen. In another example, the sulfur-containing layer formed during operation 206 may include lithium phosphorous sulfide doped with oxygen (LPSO). In another example, the sulfur-containing layer formed during operation 206 may include evaporated lithium silicon tin phosphorous sulfide doped with oxygen. In another example, the sulfur-containing layer formed during operation 206 may include lithium silicon tin phosphorous sulfide doped with oxygen (LSTPSO). In another example, the sulfur-containing layer formed during operation 206 may include a polymer-sulfide composite. Suitable ceramic phases include any of the aforementioned sulfides. Suitable polymers for a polymer-sulfide composite include polypropylene, polyethylene oxide (PEO), polyethylene oxide poly(allyl glycidyl ether) PEO-AGE, PEO-MEEGE, polyethylene oxide 2-Methoxyethoxy)ethyl glycidyl poly(allyl glycidyl ether) PEO-MEEGE-AGE, polysiloxane, polyvinylidene fluoride (PVdF), polyvinylidene fluoride hexafluoropropylene (PVdF-HFP), and rubbers such as ethylene propylene (EPR), nitrile butadiene rubber (NBR) and Styrene-Butadiene-Rubber (SBR).

Specifically, the sulfur-containing layer may include evaporated lithium phosphorous sulfide and/or lithium phosphorous sulfide (LPS). In the same or other embodiments, the sulfur-containing layer may include evaporated lithium phosphorous sulfide doped with oxygen and lithium phosphorous sulfide doped with oxygen (LPSO).

Figure 3B:
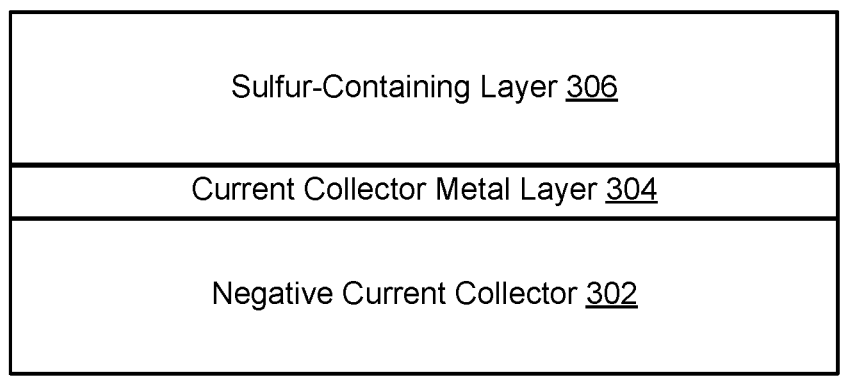
Figure 3C:
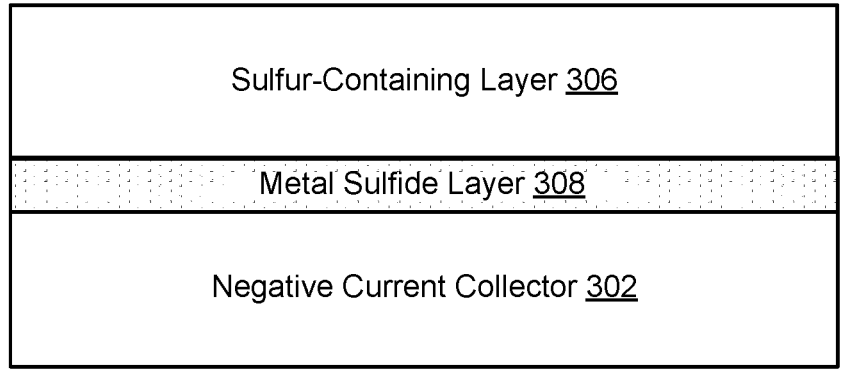

FIG. 3B illustrates a sub-assembly including sulfur-containing layer 306 disposed over current collector metal layer 304. The sulfur in the deposited sulfur-containing layer may react with at least a portion of the metal of the current collector metal layer thereby forming a metal sulfide layer. FIG. 3C illustrates a sub-assembly after this reaction is complete. This subassembly includes metal sulfide layer 308 formed from materials of sulfur-containing layer 306 and current collector metal layer 304. Current collector metal layer 304 may be fully consumed in this reaction. In this case, the metal (e.g., copper) in current collector metal layer 304 may be a limiting reagent While FIG. 3C illustrates that current collector metal layer 304 has been fully consumed in this reaction, in some embodiments, a portion of the current collector metal layer may remain after the reaction. In fact, most of the current collector metal layer may remain intact when, for example, the current collector metal layer represents the entire current collector substrate. In this later case, the extent of the reaction may be controlled by the amount of sulfur available in the sulfur-containing layer and/or process condition. Furthermore, while FIG. 3C illustrates that some of sulfur-containing layer 306 remains after completion of this reaction, in some embodiments, the entire sulfur-containing layer may be consumed in the reaction (e.g., when the sulfur-containing layer includes elemental sulfur). In some examples, the extent of the reaction may be controlled by the amount of metal provided in the current collector metal layer.

The composition of the metal sulfide layer may be represented by $M_xS_y$ such that $0<x\leq2$ and $0.5<y\leq2$. In some examples, these metal sulfides include CuS, $Cu_2S$, NiS, $NiS_2$, $Ni_3S_2$.

Formation of the metal sulfide layer may start immediately with depositing the sulfur-containing layer onto the current collector metal layer or later. In some embodiments, formation of the metal sulfide layer continues after the sulfur-containing layer is formed onto the current collector metal layer or later, e.g., after operation 206 is completed. For example the stack containing the sulfur-containing layer and current collector metal layer may be annealed during optional operation 220.

It should be noted that an order of operations 202 and 206 may be reversed in some embodiments. In these embodiments, a current collector metal layer may be formed on a sulfur containing layer. For example, a layer of copper may be evaporated onto a solid sulfide-containing electrolyte layer. In another example, a substrate having a current collector metal layer may be laminated to a previously formed a solid sulfide-containing electrolyte layer.

Returning to FIG. 2, method 200 proceeds with depositing a lithium source on the sulfur-containing layer during operation 230. In the same or other embodiments, depositing the lithium source on the sulfur-containing layer may involve evaporating the lithium source onto the sulfur-containing layer. For example, lithium metal can be evaporated, sputtered, deposited by plasma vapor deposition, or the like, onto a sulfur-containing layer from a metallic lithium source.

In some embodiments, the lithium source may be one of the following: metallic lithium, a lithium containing active material, a lithium containing positive electrode material, an alloy, a discharged positive electrode, and combinations thereof. When the lithium containing positive material is used, this material may be one of lithium nickel cobalt aluminum oxide (NCA), lithium manganese nickel oxide (LMNO), lithium iron phosphate (LFP), lithium nickel manganese cobalt oxide (NMC), lithium cobalt oxide (LCO), or a lithiated form of a metal fluoride set forth above. When the lithium source is provided in a positive electrode active material, operation 230 may be viewed as in situ processing as it is performed during a normal fabrication of an electrochemical cells or, more specifically, while forming a sub-assembly including positive and negative electrodes.

Returning to FIG. 2, method 200 proceeds with transferring lithium from the lithium source to contact the metal sulfide layer during operation 240. In some embodiments, lithium is transferred through the sulfur-containing layer that remained above the metal sulfide layer. For example, lithium ions may be transferred through a solid sulfide containing electrolyte using, for example, electrochemical migration. In this example, operation 240 may be a part of the initial battery cycling and, therefore, may be an in situ operation of fabricating the electrochemical cell. Specifically, transferring lithium from the lithium source through the sulfide-containing solid electrolyte layer and into the metal sulfide layer may involve applying a voltage between the lithium source and the metal sulfide layer, such as applying a charge potential to two terminals of the rechargeable electrochemical cell.

In some examples, lithium metal can be positioned in contact with the current collector metal and the metal sulfide. In some examples, this lithium metal can be transferred through the metal sulfide to form the anolyte lithium sulfide.

The transferred lithium may react with the metal sulfide of the metal sulfide layer thereby forming the anolyte layer. The anolyte layer includes a lithium sulfide. The lithium sulfide of the anolyte layer may be represented by $Li_2S$, $Li_{1.944}S$, or $LiS_x$, and wherein $0<x\leq2$. In some embodiments, the average thickness of the anolyte layer may be between about 5 nanometers and 200 nanometers. Additional features of the anolyte layer are described above with reference to FIGS. 1A-1C.

Figure 3D:
Figure 3D:
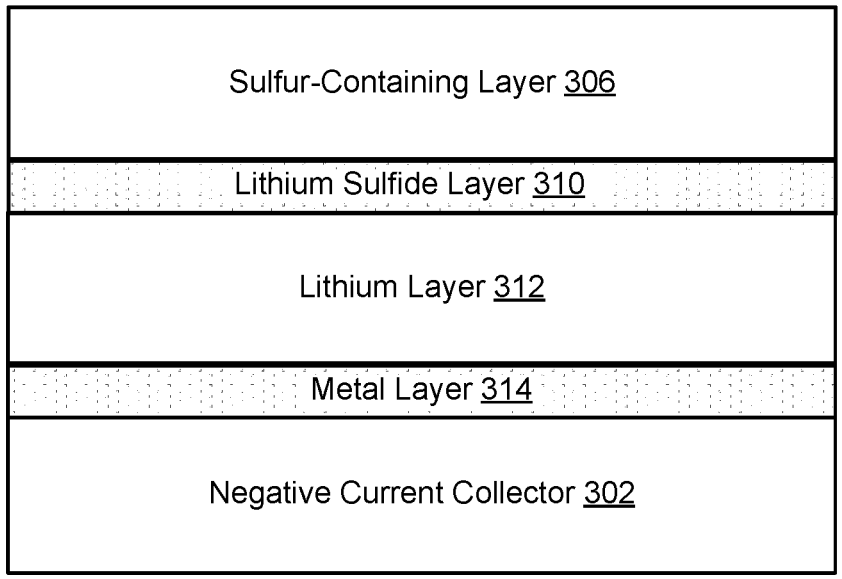

FIG. 3D is a schematic illustration of an assembly after completing operation 240, in accordance with some embodiments. The transferred lithium formed lithium sulfide layer 310 and releases metal thereby forming lithium layer 312. If more lithium is transferred during this operation than needed to convert all metal sulfide into lithium sulfide, then this additional layer may be accumulated into lithium layer 312. It should be noted that lithium sulfide layer 310 is operable as an anolyte layer. The rest of the electrolyte layer may be sulfur-containing layer 306. Furthermore, lithium sulfide layer 310 is conductive to lithium ions resulting in lithium layer 312 being formed between lithium sulfide layer 310 and metal layer 314. Specifically, transported lithium ions (that did not react to form lithium sulfide layer 310) receive electrodes from metal layer 314 and converted into lithium metal deposited as lithium layer 312.

In some examples, metal layer 314 is not present after operation 240 and the metal that formed the metal sulfide from which the lithium sulfide forms is incorporated into the lithium sulfide layer.

Figure 3E:
Figure 3E:
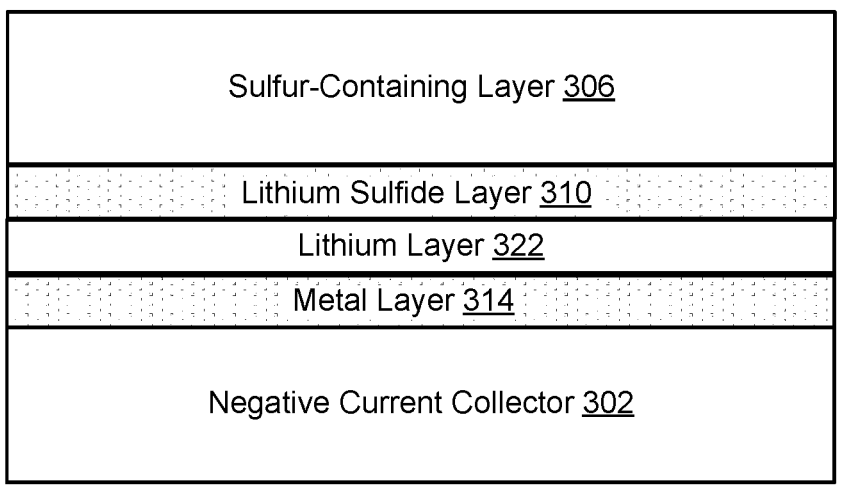

FIGS. 3D and 3E schematically illustrate charge and discharge states of a cell that includes a shown assembly. Specifically, lithium layer 312 in FIG. 3D (illustrating the charge state) is thicker than lithium layer 322 in FIG. 3E (illustrating the discharge state). During cell cycling, lithium is transferred (in the form of lithium ions) through lithium sulfide layer 310 and sulfur-containing layer 306, which collective operate as a solid electrolyte.

Figure 6:
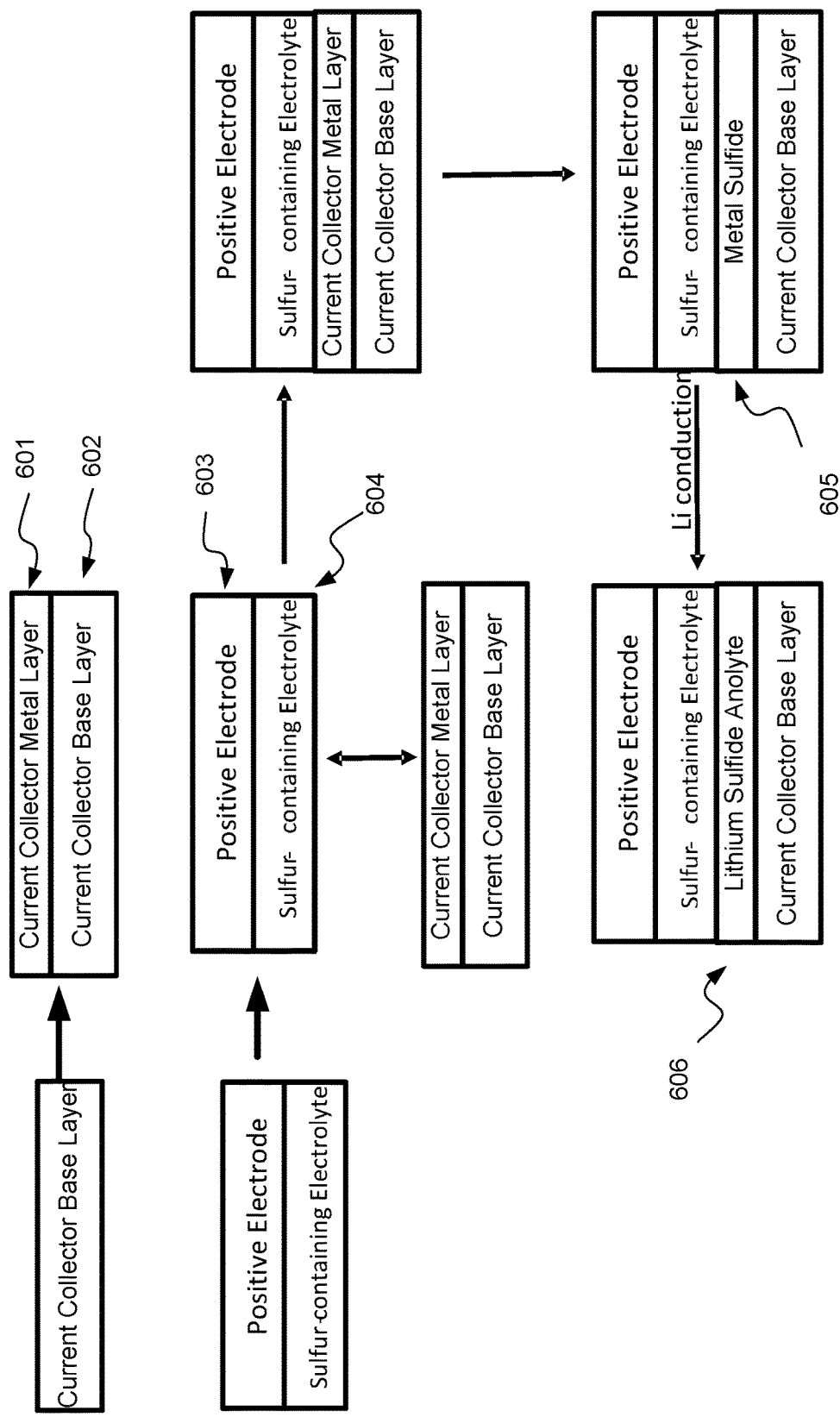
FIG. 6 illustrates an example method for making the lithium sulfide anolyte onto a bilayer current collector that includes a current collector base layer and a current collector metal layer, the latter being converted into the lithium sulfide anolyte as set forth herein.

FIG. 6 schematically illustrates another method in accordance with the disclosure herein for making a lithium sulfide anolyte layer. In this example, a bilayer current collector is provided having current collector metal layer 601 in direct contact with current collector base layer 602. In this example, positive electrode 603 having sulfur-containing electrolyte 604 on one side is also provided. During processing, the bilayer current collector is pressed to, or contacts, or is sandwiched with, positive electrode 603 having sulfur-containing electrolyte 604 such that the current collector metal layer 601 is in direct contact with the sulfur-containing electrolyte 604. Once layer 601 contacts sulfur-containing electrolyte 604, as such shown in FIG. 6, the metal layer 601 reacts with the sulfur in sulfur-containing electrolyte 604 to form a metal sulfide 605. Following this reaction, lithium is transferred (e.g., from the positive electrode 603) to the metal sulfide 605 to form a lithium sulfide anolyte 606.

Figure 7:
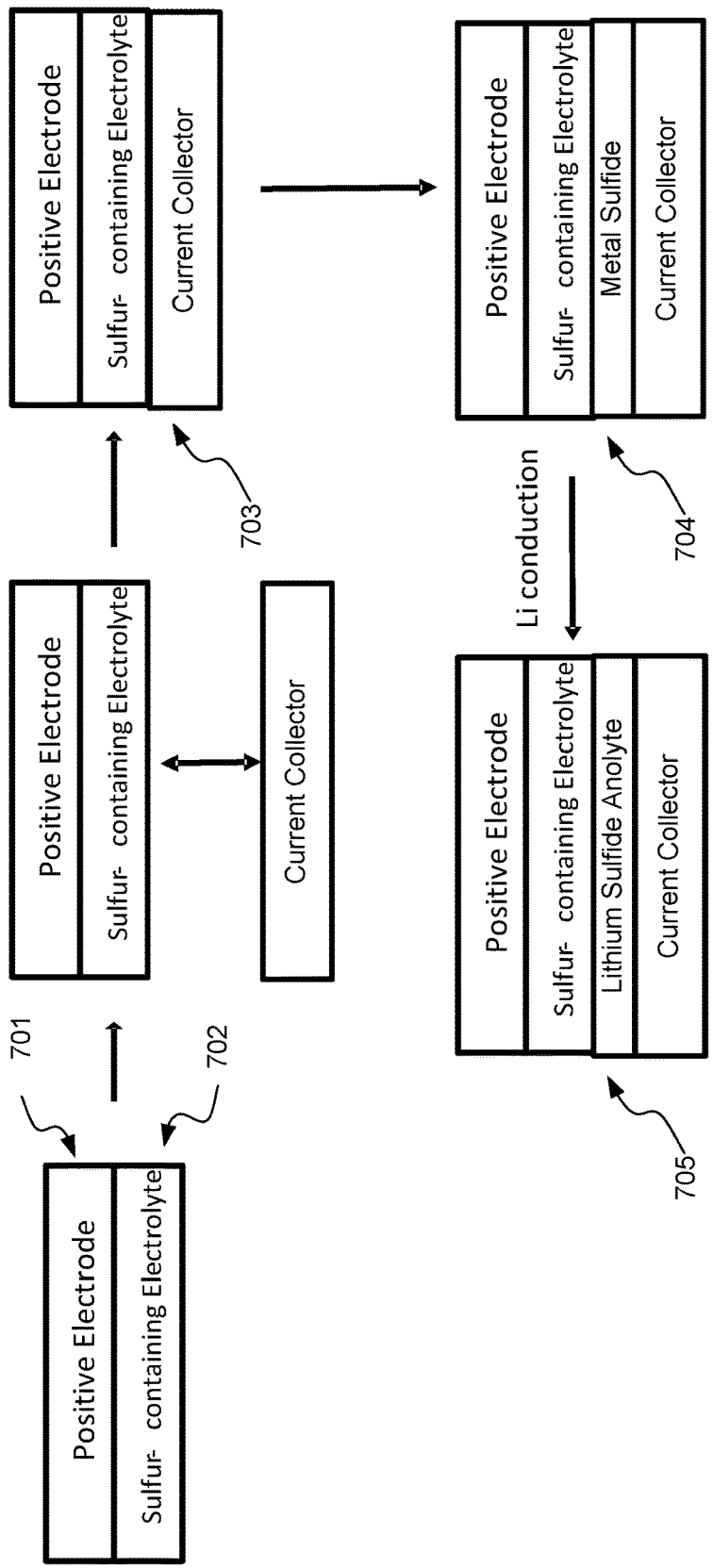
FIG. 7 illustrates an example method for making the lithium sulfide anolyte onto a current collector.

FIG. 7 schematically illustrates another method in accordance with the disclosure herein for making a lithium sulfide anolyte layer. In this example, current collector 703 is provided. In this example, positive electrode 701 having sulfur-containing 702 on one side is also provided. During processing, the current collector 703 is pressed to, or contacts, or is sandwiched with, the positive electrode 701 having sulfur-containing 702 such that the current collector 703 is in direct contact with the sulfur-containing electrolyte 702. Once current collector 703 contacts layer 702, as shown in FIG. 7, the metal in current collector 703 reacts with the sulfur in the sulfur-containing electrolyte 702 to form metal sulfide 704. Following this reaction, lithium is transferred (e.g., from the positive electrode 701) to metal sulfide 704 to form lithium sulfide anolyte 705.

Experimental Results

Figure 4A:
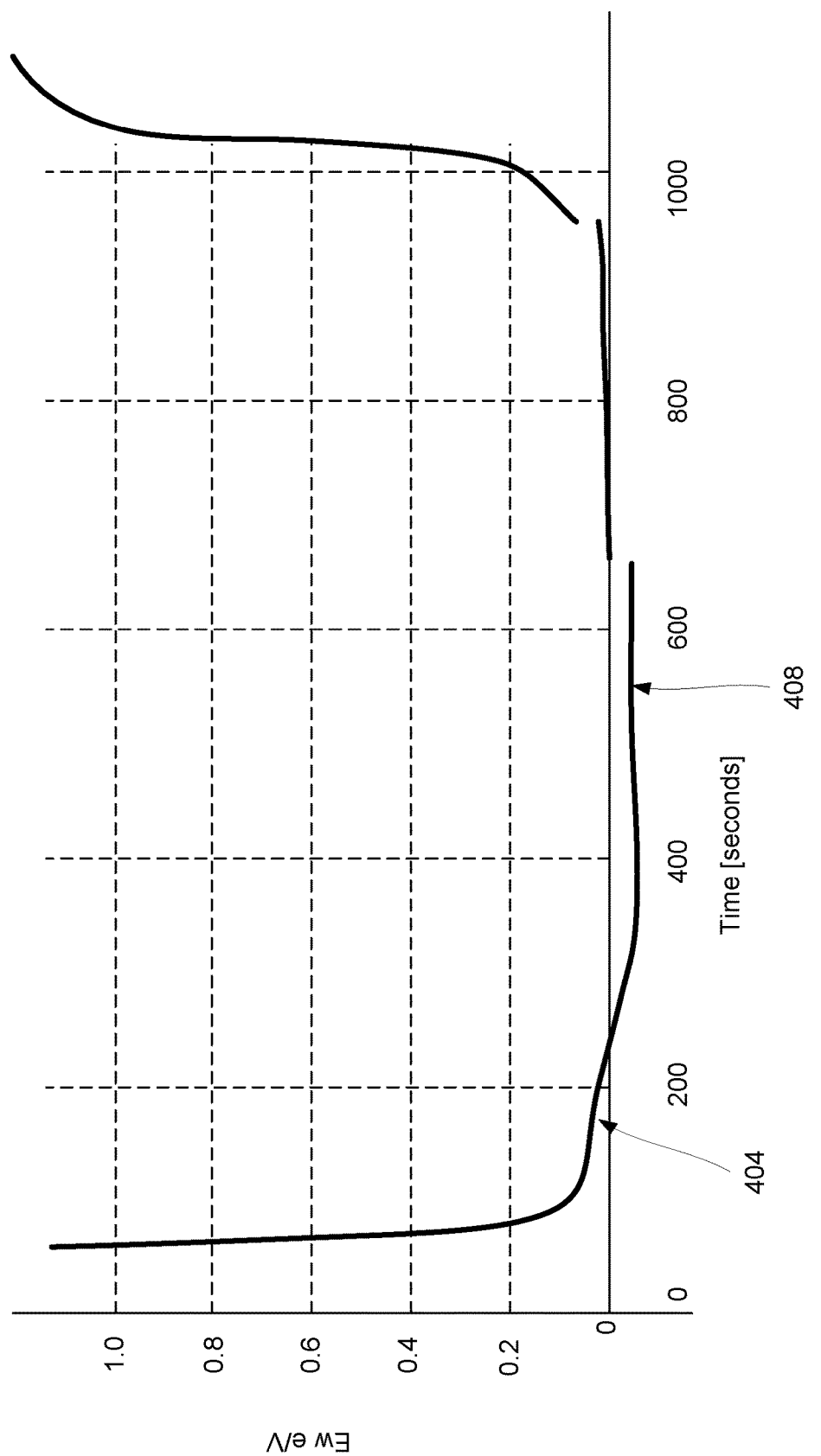
FIG. 4A is a voltage profile for a test cell fabricated with lithium sulfide anolyte, in accordance with some embodiments.

FIG. 4A is a voltage profile for a test cell fabricated with lithium sulfide anolyte, in accordance with some embodiments. The cell was fabricated using a stainless steel substrate with a 10 nanometer thick layer of copper evaporated onto the substrate. The electrolyte was evaporated LPS and the positive electrode was metallic lithium. The cell was tested using a constant current density of 100 micro-Amperes per centimeter square at a temperature. Point 404 in this profile indicate a point at which copper sulfide is converted into lithium sulfide. Flat portion 408 corresponds to lithium plating, i.e., a buildup of a lithium metal layer below the lithium sulfide layer.

Figure 4C:
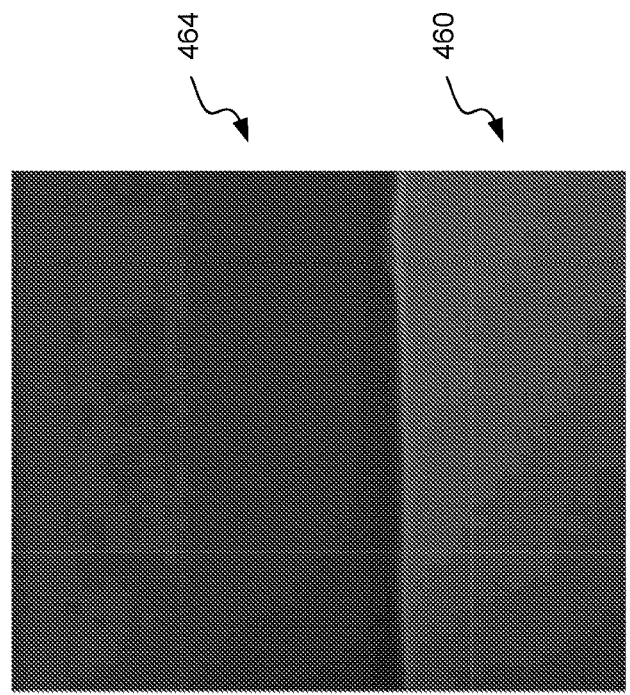
FIGS. 4B and 4C are scanning electron microscope (SEM) images of negative electrode assemblies prepared in accordance with methods described herein.
Figure 4B:
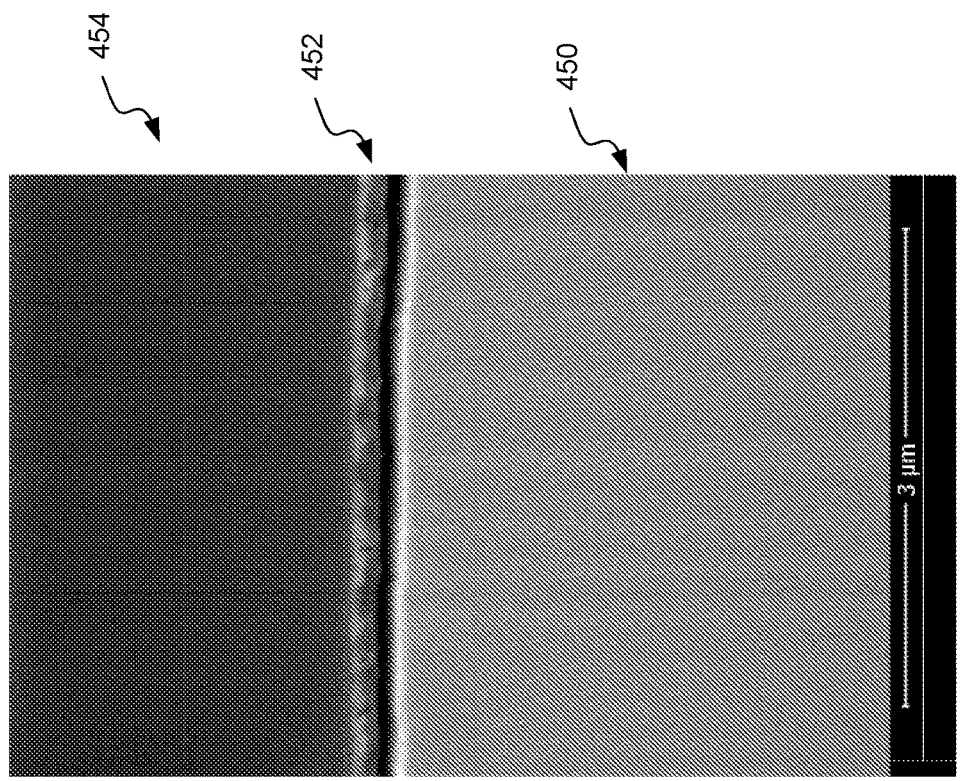

FIGS. 4B and 4C are scanning electron microscope (SEM) images of different negative electrode assemblies. FIG. 4B represents a sample in which stainless steel substrate 450 received an evaporated copper layer. This copper layer was later converted into copper sulfide layer 452 when solid sulfide-containing electrolyte layer 454 was deposited over the copper layer. It should be noted that solid sulfide-containing electrolyte layer 454 was deposited without exposing the evaporated copper layer to air. Therefore, the evaporated copper layer did not form a native oxide and was easily converted into a copper sulfide.

FIG. 4C represents a sample in which copper foil 460 received solid sulfide-containing electrolyte layer 464. Copper sulfide did not form in this sample. Without being restricted to any particular theory, it is believed that copper foil 460 had a native oxide on its surface that blocked sulfur from contacting copper.

Battery Examples

Figure 5B:
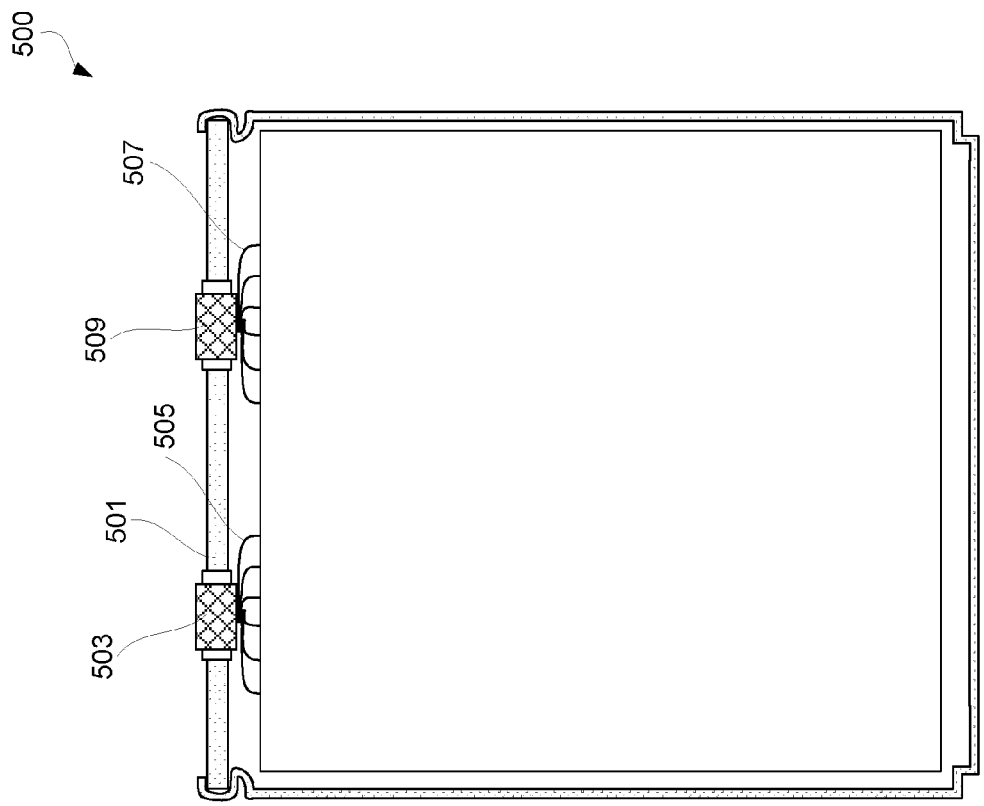
FIGS. 5A and 5B are schematic representations of an electrochemical cell having a lithium sulfide anolyte layer, in accordance with some embodiments.
Figure 5A:
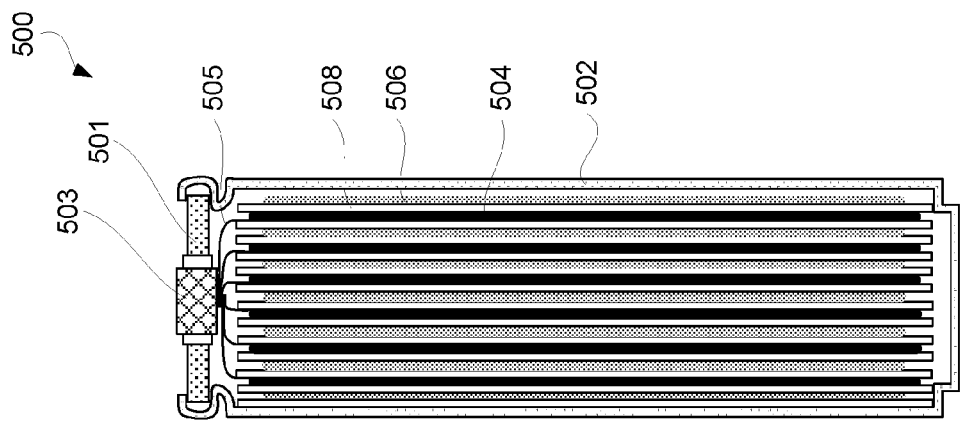

FIGS. 5A and 5B are schematic representations of electrochemical cell 500 having a lithium sulfide anolyte layer disposed between each pair of a positive electrode and a negative electrode, in accordance with some embodiments. Specifically, electrochemical cell 800 is shown having one or more first electrodes 504 and one or more second electrodes 506. First electrodes 504 and second electrodes 506 are different types, e.g., positive and negative electrodes, and include corresponding active materials, as described above. First electrodes 504 and second electrodes 506 may be arranged as a stack, wound (e.g., wound as ajellyroll), or have any other arrangement such that active material layers of one type of electrodes face active material layers of the other type of electrodes.

First electrodes 504 and second electrodes 506 are in ionic communication with each other using solid electrolyte layers 506. As further described above in this document, the lithium sulfide anolyte layer is a part of each solid electrolyte layer 506 that interfaced with negative electrodes. First electrodes 504 are electrically coupled to first terminal 503 using, for example, first tabs 505. Second electrodes 506 are electrically coupled to second terminal 509 using, for example, second tabs 507. First terminal 503 and second terminal 509 may be used to drive the current between first electrodes 504 and second electrodes 506, for example, to add lithium to negative electrode assemblies and to convert metal sulfides into lithium sulfides during fabrication of the lithium sulfide anolyte layer.

First electrode 504 and second electrode 506 may have a relatively small thickness, for example, to allow a large number of electrodes to be stacked together and fit into the same electrochemical cell. For example, a thickness of each electrode may be between about 20 micrometers and 500 micrometers or, more specifically, between about 50 micrometers and 200 micrometers, such as about 100 micrometers. With 100 to 300 electrodes stacked together, electrochemical cell 500 may have a thickness of between about 10 millimeters and 30 millimeters. It is to be appreciated that other dimensions are possible as well. For example, the number of first electrode 504 and second electrode 506 being stacked together can be based on the electrical characteristics of electrochemical cell 500.

In some embodiments, first tabs 505 may be formed from current collectors of first electrodes 504, while second tabs 507 may be formed from current collectors of second electrodes 506. First terminal 503 and second terminal 509 may be supported by top cover 501. Alternatively, first tabs 505 and second tabs 507 may be structure that are welded, crimped, or otherwise attached to the current collectors of the respective electrodes. Regardless of tab design, first tabs 505 and second tabs 507 may be arranged into two separate groups to provide electrical and thermal interface to first terminal 503 and second terminal 509, respectively. In a specific embodiment, first tabs 505 are welded together and to first terminal 503 and second tabs 507 are welded together and to second terminal 509.

First electrodes 504 and second electrodes 506 may be sealed within an enclosure including case 502 and top cover 501. In some embodiments, case 502 of electrochemical cell 505 is substantially rigid. For example, case 502 may be made of a hard plastic or polymer material. In some embodiments, cell 500 has a housing or claim to maintain a pressure within cell 500 during operation (charge/discharge) of cell 500. In some embodiment, cell 500 has a bladder or foam piece within cell 500 to maintain a pressure within cell 500 during operation (charge/discharge) of cell 500.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A negative electrode assembly for a rechargeable electrochemical cell, the negative electrode assembly comprising:
   a current collector layer comprising a metal selected from the group consisting of copper, nickel, iron, lithium, aluminum, magnesium, indium, tungsten, molybdenum, alloys thereof, multilayers thereof, and combinations thereof; and
   an anolyte layer comprising a lithium sulfide compound disposed over the current collector metal layer and having a thickness between 1 nm and 100 nm;
   wherein the anolyte layer directly contacts a sulfide-containing solid electrolyte layer; and
   a lithium metal layer disposed between the current collector metal layer and the anolyte layer.

2. The negative electrode assembly of claim 1, wherein the anolyte layer consists essentially of the lithium sulfide compound.

3. The negative electrode assembly of claim 1, wherein the anolyte layer directly contacts the current collector metal layer.

4. The negative electrode assembly of claim 1, wherein a combined average concentration of lithium and sulfur in the anolyte layer is greater than a combined average concentration of lithium and sulfur in the sulfide-containing solid electrolyte layer.

5. The negative electrode assembly of claim 1, wherein an average concentration of lithium in the anolyte layer is greater than an average concentration of lithium in the sulfide-containing solid electrolyte layer.

6. The negative electrode assembly of claim 4, wherein the average concentration is determined based on the molar amounts of the lithium and sulfur.

7. The negative electrode assembly of claim 1, wherein a combined average concentration of lithium and sulfur in the anolyte layer is at least 90 atomic %.

8. The negative electrode assembly of claim 1, wherein the anolyte layer further comprises the metal of the current collector metal layer.

9. The negative electrode assembly of claim 8, wherein the metal of the current collector metal layer present in the anolyte layer is copper.

10. The negative electrode assembly of claim 8, wherein the metal of the current collector metal layer present in the anolyte layer is iron.

11. The negative electrode assembly of claim 8, wherein the metal of the current collector metal layer present in the anolyte layer is nickel.

12. The negative electrode assembly of claim 1, wherein the sulfide-containing solid electrolyte layer further comprises at least one element selected from the group consisting of lithium, phosphorous, silicon, germanium, antimony, arsenic, and tin.

13. The negative electrode assembly of claim 12, wherein the sulfide-containing solid electrolyte layer further comprises a combination of at least two or more members selected from the group consisting of lithium, phosphorous, silicon, germanium, antimony, arsenic, and tin.

14. The negative electrode assembly of claim 12, wherein an average concentration of the at least one of phosphorous, silicon, germanium, antimony, arsenic, or tin in the sulfide-containing solid electrolyte layer is greater than that in the anolyte layer.

15. The negative electrode assembly of claim 1, wherein a thickness of the anolyte layer is about 5 nanometers or about 100 nanometers.

16. The negative electrode assembly of claim 1, wherein the lithium sulfide of the anolyte layer is represented by $LiS_x$, and wherein $0<x\leq 2$.

17. The negative electrode assembly of claim 1, wherein the lithium sulfide of the anolyte layer is represented by $Li_2S$.

18. The negative electrode assembly of claim 1, wherein the lithium sulfide of the anolyte layer is represented by $Li_{1.944}S$.

19. The negative electrode assembly of claim 1, wherein the sulfide-containing solid electrolyte layer comprises a sulfide selected from the group consisting of evaporated lithium phosphorous sulfide, lithium phosphorous sulfide (LPS), evaporated lithium silicon sulfide, lithium silicon sulfide (LSS), evaporated lithium silicon tin phosphorous sulfide, lithium silicon tin phosphorous sulfide (LSTPS), evaporated lithium tin sulfide, lithium tin sulfide (LTS), evaporated lithium arsenic tin sulfide, lithium arsenic tin sulfide (LATS), evaporated lithium germanium phosphorous sulfide, lithium germanium phosphorous sulfide (LGPS), evaporated lithium phosphorous sulfide doped with oxygen, lithium phosphorous sulfide doped with oxygen (LPSO), evaporated lithium silicon tin phosphorous sulfide doped with oxygen, lithium silicon tin phosphorous sulfide doped with oxygen (LSTPSO), and a polymer-sulfide composite.

20. The negative electrode assembly of claim 1, wherein the sulfide-containing solid electrolyte layer comprises a sulfide selected from the group consisting of evaporated lithium phosphorous sulfide and lithium phosphorous sulfide (LPS).

21. The negative electrode assembly of claim 1, wherein the sulfide-containing solid electrolyte layer comprises a sulfide selected from the group consisting of evaporated lithium phosphorous sulfide doped with oxygen and lithium phosphorous sulfide doped with oxygen (LPSO).

22. The negative electrode assembly of claim 1, wherein the sulfide-containing solid electrolyte layer comprises a sulfide selected from the group consisting of evaporated lithium arsenic tin sulfide and lithium arsenic tin sulfide (LATS).

23. The negative electrode assembly of claim 1, wherein the current collector metal layer is a part of a bilayer current collector comprising a base layer having a metal different from the metal of the current collector metal layer.

24. The negative electrode assembly of claim 23, wherein the metal of the current collector metal layer comprises copper.

25. The negative electrode assembly of claim 23, wherein the metal of the base layer comprises nickel, iron, lithium, aluminum, magnesium, indium, alloys thereof, multilayers thereof, or combinations thereof.

26. The negative electrode assembly of claim 23, wherein the metal of the base layer comprises nickel.

27. The negative electrode assembly of claim 24, wherein the copper of the current collector metal layer is substantially free from oxygen.

28. The negative electrode assembly of claim 1, wherein a thickness of the lithium metal layer is between about 1 μm to about 100 μm.

29. The negative electrode assembly of claim 1, wherein a thickness of the lithium metal layer is about 50 μm.

30. A battery comprising:
a positive electrode; and
a negative electrode,
- the negative electrode comprising a current collector metal layer comprising a metal selected from the group consisting of copper, nickel, iron, lithium, aluminum, magnesium, indium, tungsten, molybdenum, alloys thereof, multilayers thereof, and combinations thereof;
- a sulfide-containing solid electrolyte layer disposed between the positive electrode and the negative electrode and providing ionic communication between the positive electrode and the negative electrode,
- the sulfide-containing solid electrolyte comprising an anolyte layer disposed over the current collector metal layer,
- wherein the anolyte layer comprises a lithium sulfide compound and has a thickness between about 10 nm and 1 µm, and
- a lithium metal layer disposed between the current collector metal layer and the anolyte layer.

* * * * *